United States Patent
Moteki et al.

(10) Patent No.: US 10,755,439 B2
(45) Date of Patent: Aug. 25, 2020

(54) ESTIMATION DEVICE, ESTIMATION METHOD AND STORAGE MEDIUM

(71) Applicant: FUJITSU LIMITED, Kawasaki-shi, Kanagawa (JP)

(72) Inventors: Atsunori Moteki, Chofu (JP); Toshiyuki Yoshitake, Kawasaki (JP); Ayu Karasudani, Yamato (JP); Yasuto Watanabe, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 16/272,412

(22) Filed: Feb. 11, 2019

(65) Prior Publication Data
US 2019/0279397 A1 Sep. 12, 2019

(30) Foreign Application Priority Data
Mar. 8, 2018 (JP) .................................. 2018-041861

(51) Int. Cl.
*G06T 7/73* (2017.01)
*G06T 7/168* (2017.01)
(Continued)

(52) U.S. Cl.
CPC .................. *G06T 7/75* (2017.01); *G06T 7/12* (2017.01); *G06T 7/168* (2017.01); *G06T 7/543* (2017.01)

(58) Field of Classification Search
CPC .. G06T 7/75; G06T 7/168; G06T 7/12; G06T 7/543; G06T 7/33; G06T 2207/30244;
(Continued)

(56) References Cited

U.S. PATENT DOCUMENTS

2008/0107345 A1* 5/2008 Melikian ............... G06K 9/3241
382/209
2008/0292180 A1* 11/2008 Kobayashi .............. G06T 7/75
382/154
(Continued)

FOREIGN PATENT DOCUMENTS

JP 2007-333679 12/2007
JP 2015-007639 1/2015
(Continued)

OTHER PUBLICATIONS

Z. Zhang, "A Flexible New Technique for Camera Calibration", IEEE Transactions on Pattern Analysis and Machine Intelligence, vol. 22, No. 11, pp. 1330-1334, Nov. 2000 (5 pages).
(Continued)

*Primary Examiner* — Carol Wang
(74) *Attorney, Agent, or Firm* — Fujitsu Patent Center

(57) ABSTRACT

An estimation device includes a processor coupled to a memory and configured to detect a plurality of feature lines from an image of the object photographed by an imaging device, generate a plurality of sets of a predetermined number of line segments among the plurality of line segments, select a set to be processed from among the plurality of sets based on a length-first selection order in which a line segment that is longer than other line segments is preferentially selected, generate the predetermined number of combinations in which the predetermined number of line segments included in the set to be processed and the predetermined number of feature lines among the plurality of feature lines are associated with each other on a one-to-one basis, and estimate a position and a orientation of the imaging device in a three-dimensional space using the predetermined number of combinations.

12 Claims, 23 Drawing Sheets

(51) Int. Cl.
*G06T 7/12* (2017.01)
*G06T 7/543* (2017.01)

(58) Field of Classification Search
CPC .... G06T 7/74; G06T 7/73; G06T 7/70; G06K 9/00671
See application file for complete search history.

(56) References Cited

U.S. PATENT DOCUMENTS

| | | | | |
|---|---|---|---|---|
| 2010/0034484 | A1* | 2/2010 | Kido | G06T 7/75 382/294 |
| 2011/0157178 | A1* | 6/2011 | Tuzel | G06T 7/586 345/426 |
| 2012/0099798 | A1 | 4/2012 | Saruta et al. | |
| 2012/0269388 | A1* | 10/2012 | Jiang | G01C 15/00 382/103 |
| 2013/0335575 | A1* | 12/2013 | Tsin | G06T 7/251 348/169 |
| 2015/0269436 | A1* | 9/2015 | Kim | G06K 9/00624 382/103 |
| 2017/0132752 | A1* | 5/2017 | Aoyagi | G06T 19/20 |
| 2017/0287154 | A1* | 10/2017 | Yamaguchi | G06T 7/251 |

FOREIGN PATENT DOCUMENTS

| | | |
|---|---|---|
| JP | 2015-118641 | 6/2015 |
| JP | 2016-170050 | 9/2016 |

OTHER PUBLICATIONS

R. G. Gioi et al., "LSD: a Line Segment Detector", Image Processing on Line, 2 (2012), pp. 35-55, Mar. 2012 (21 pages).

L. G. Roberts, "Machine Perception of Three-Dimensional Solids", MIT Lincoln Lab. Rep., TR3315, pp. 1-82, May 1963 (82 pages).

C. Xu et al., "Pose Estimation from Line Correspondences: A Complete Analysis and a Series of Solutions", IEEE Transactions on Pattern Analysis and Machine Intelligence, vol. 39, No. 6, pp. 1209-1222, Jun. 2017 (14 pages).

Bruce G. Baumgart, "A polyhedron representation for computer vision", Proceedings of the May 19-22, 1975, National Computer Conference and Exposition, pp. 589-596, 1975 (8 pages).

* cited by examiner

FIG. 4

| ID | STARTING POINT [mm] | ENDING POINT [mm] |
|---|---|---|
| 1 | (0, 0, 0) | (0, 0, 15) |
| 2 | (0, 10, 0) | (0, 15, 10) |
| ... | ... | ... |
| 20 | (25, 15, 10) | (25, 15, 30) |

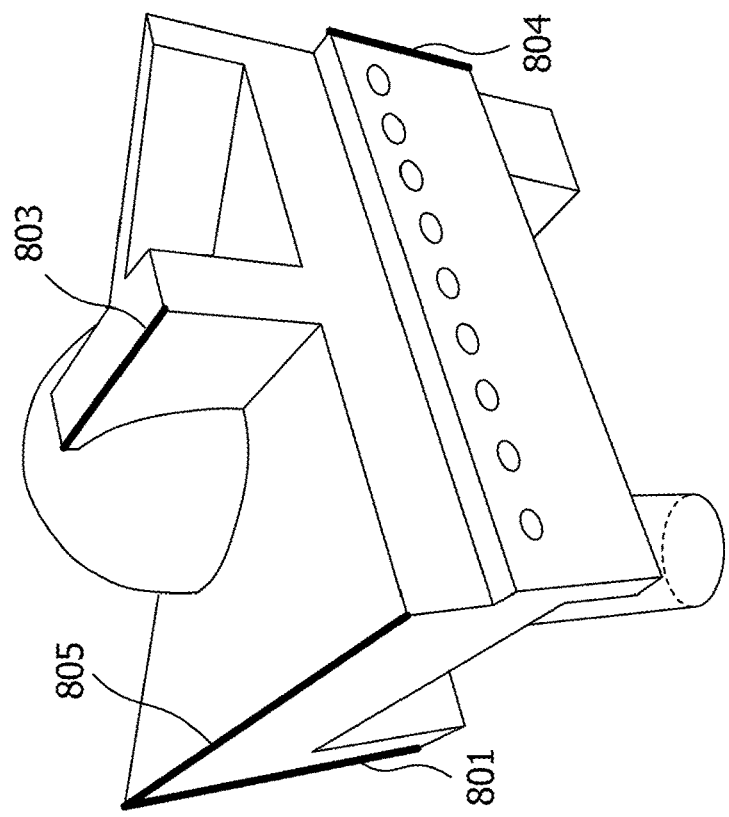
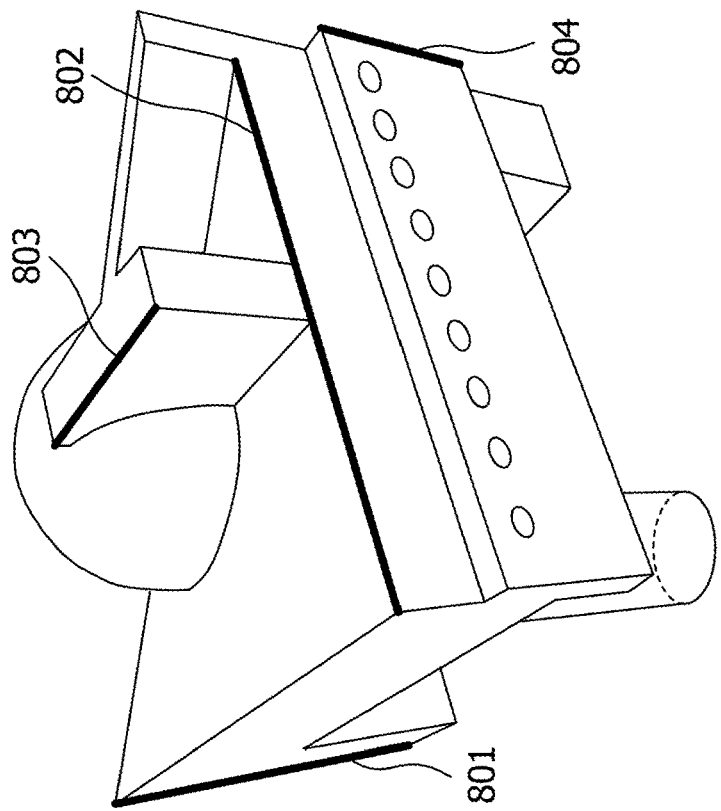

FIG. 9

| RANK | LINE SEGMENT ID1 | LINE SEGMENT ID2 | LINE SEGMENT ID3 | LINE SEGMENT ID4 | FEATURE LINE ID1 | FEATURE LINE ID2 | FEATURE LINE ID3 | FEATURE LINE ID4 | DETERMINATION RESULT |
|---|---|---|---|---|---|---|---|---|---|
| 1 | 21 | 47 | 2 | 86 | 1 | 2 | 3 | 4 | × |
| 2 | 21 | 19 | 47 | 33 | 1 | 2 | 3 | 5 | × |
| 3 | 21 | 86 | 51 | 8 | 1 | 2 | 3 | 6 | ○ |
| ⋮ | ⋮ | ⋮ | ⋮ | ⋮ | ⋮ | ⋮ | ⋮ | ⋮ | ⋮ |
| 4 | 47 | 33 | 17 | 8 | 1 | 2 | 3 | 4 | × |
| ⋮ | ⋮ | ⋮ | ⋮ | ⋮ | ⋮ | ⋮ | ⋮ | ⋮ | ⋮ |
|  |  |  |  |  | 1 | 2 | 3 | 4 | ○ |
| ⋮ | ⋮ | ⋮ | ⋮ | ⋮ | ⋮ | ⋮ | ⋮ | ⋮ | ⋮ |
|  |  |  |  |  | 1 | 2 | 3 | 4 | × |
| ⋮ | ⋮ | ⋮ | ⋮ | ⋮ | ⋮ | ⋮ | ⋮ | ⋮ | ⋮ |

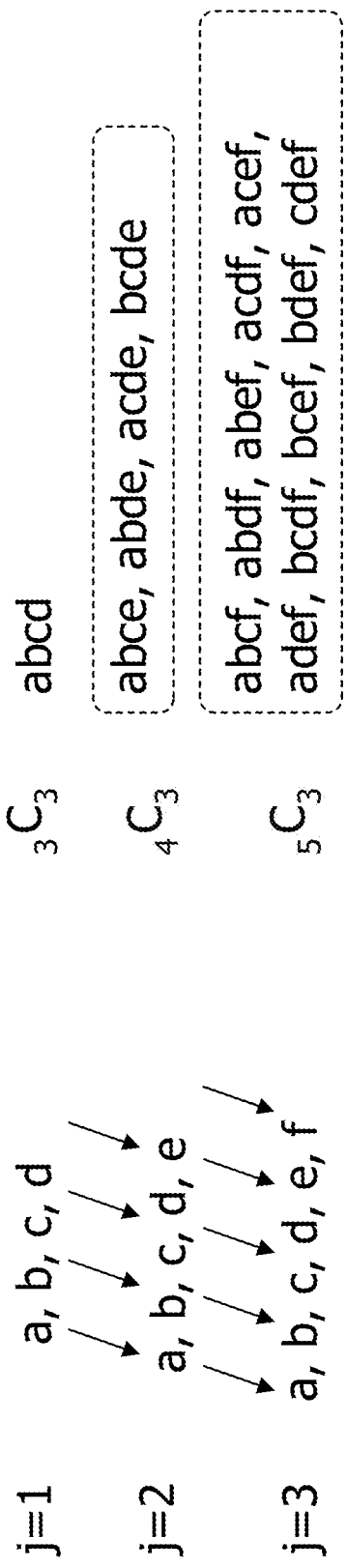

FIG. 14A

| SET OF FOUR | | | | ERROR MINIMUM VALUE |
|---|---|---|---|---|
| 0 | 1 | 2 | 3 | 902.1 |
| 0 | 1 | 2 | 4 | 547.798 |
| 0 | 1 | 2 | 5 | 365.342 |
| 0 | 1 | 2 | 6 | |
| 0 | 1 | 3 | 4 | |
| 0 | 1 | 2 | 7 | |
| 0 | 1 | 3 | 5 | |
| 0 | 1 | 2 | 7 | |
| 0 | 1 | 3 | 5 | |
| 0 | 1 | 3 | 6 | |

FIG. 14B

| SET OF FOUR | | | | ERROR MINIMUM VALUE |
|---|---|---|---|---|
| 0 | 1 | 3 | 12 | 541.135 |
| 0 | 1 | 3 | 11 | 523.735 |
| 0 | 1 | 2 | 5 | |
| 0 | 1 | 3 | 10 | 473.315 |
| 0 | 1 | 2 | 11 | 218.923 |

FIG. 14C

| SET OF FOUR | | | | ERROR MINIMUM VALUE |
|---|---|---|---|---|
| 0 | 1 | 2 | 3 | 902.1 |
| 0 | 1 | 3 | 4 | 607.08 |
| 0 | 1 | 2 | 4 | 365.342 |
| 0 | 2 | 3 | 4 | 15.0222 |
| 1 | 2 | 3 | 4 | |
| 0 | 1 | 2 | 5 | |
| 0 | 1 | 3 | 5 | |
| 0 | 1 | 4 | 5 | |

ESTIMATION DEVICE, ESTIMATION METHOD AND STORAGE MEDIUM

CROSS-REFERENCE TO RELATED APPLICATION

This application is based upon and claims the benefit of priority of the prior Japanese Patent Application No. 2018-41861, filed on Mar. 8, 2018, the entire contents of which are incorporated herein by reference.

FIELD

The embodiments discussed herein are related an estimation device, an estimating method, and an estimating program.

BACKGROUND

In recent years, systems for displaying images using augmented reality (AR) technology have been widespread (see, for example, Japanese Laid-open Patent Publication No. 2015-118641). In one example of the AR technology, an object is photographed using a camera mounted on a personal computer (PC), a mobile terminal device, or the like, and the position and the orientation of the camera in the three-dimensional space are estimated from the image of the object. Content information is superimposed and displayed at any position in the image based on the determined position and the orientation of the camera.

From the image of the object, various techniques for estimating the relative position and the relative orientation between the object and the camera are known (see, for example, Japanese Laid-open Patent Publication No. 2007-333679, Japanese Laid-open Patent Publication No. 2015-7639, and Japanese Laid-open Patent Publication No. 2016-170050). Techniques such as a camera calibration, a line segment detection, a three-dimensional machine perception, a orientation estimation by straight line association, a polyhedral representation for computer vision, and so forth are also known. As a related art, disclosed are, for example, Japanese Laid-open Patent Publication No. 2015-118641, Japanese Laid-open Patent Publication No. 2007-333679, Japanese Laid-open Patent Publication No. 2015-7639, and Japanese Laid-open Patent Publication No. 2016-170050.

In a case where the position and the orientation of the camera are estimated by associating an image of an object photographed by a camera with computer-aided design (CAD) data representing the three-dimensional shape of the object are associated with each other, the amount of calculation for the association increases.

Such a problem is not limited to the case of associating the image of the object with the CAD data but also in the case of associating the image of the object with other shape information.

In view of the above, it is desirable to reduce the amount of calculation for associating the image of the object with the shape information representing the shape of the object when estimating the position and the orientation of the imaging device.

SUMMARY

According to an aspect of the embodiments, an estimation device includes a memory configured to store shape information including a plurality of line segments representing a shape of an object, and a processor coupled to the memory and configured to detect a plurality of feature lines from an image of the object photographed by an imaging device, generate a plurality of sets of a predetermined number of line segments among the plurality of line segments, select a set to be processed from among the plurality of sets based on a length-first selection order in which a line segment that is longer than other line segments is preferentially selected, generate the predetermined number of combinations in which the predetermined number of line segments included in the set to be processed and the predetermined number of feature lines among the plurality of feature lines are associated with each other on a one-to-one basis, and estimate a position and a orientation of the imaging device in a three-dimensional space using the predetermined number of combinations.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating CAD data;

FIGS. 8A, and 8B are diagrams illustrating feature lines;

FIG. 9 is a diagram illustrating a determination result for feature line candidates;

FIG. 13 is a diagram illustrating a process of generating a list of a set of four 3D-line-segments;

FIGS. 14A, 14B, and 14C are diagrams illustrating an error of the estimation process;

DESCRIPTION OF EMBODIMENTS

Hereinafter, with reference to the drawings, embodiments will be described in detail. As an application of AR technology, manufacturing diagnosis may be performed by superimposedly displaying CAD data representing the three-dimensional shape of a member manufactured at the manufacturing site on the image of the member. In this case, the on-site operator conducts manufacturing diagnosis of the member, and it is desirable that manufacturing diagnosis be performed quickly and easily.

Since the member is an artifact, the CAD data includes many straight line portions. Therefore, it is possible to estimate the position and the orientation of the camera relative to the member using the straight line portion included in the CAD data. In this case, as described in Japanese Laid-open Patent Publication No. 2015-118641 or the prior Japanese Patent Application No. 2016-187515, a method is offered in which a feature line detected from an image of an object and a 3D-line-segment included in the CAD data of the object are associated with each other.

However, when performing round robin calculation using all combinations of the feature lines detected from the image and the 3D-line-segments included in the CAD data, the amount of calculation increases as the number of feature lines and 3D-line-segments increases. For example, in a case of generating four combinations (association pairs) obtained by selecting four feature lines out of m feature lines, and four 3D-line-segments out of n 3D-line-segments, the total number of combinations is $_mC_4 \times {}_nC_4$. An example of calculation of the total number of combinations according to the complexity of the three-dimensional shape is described below.

(1) Object of Simple Shape

When m=12 and n=7, the total number of combinations is 17325.

(2) Object of Complicated Shape

When m=63 and n=130, the total number of combinations is $6.75*10^{12}$.

(3) Object with More Complicated Shape

When m=314 and n=158, the total number of combinations is $9.93*10^{15}$.

In this way, as the number of feature lines and 3D-line-segments increases, the total number of combinations is enormous, and the amount of calculation for generating association pairs increases. For this reason, assuming that the calculation time for estimating the position and the orientation of the camera by using four association pairs is about 10 ms, an optimal solution for the four association pairs is not determined within a few minutes, which is a practical calculation time, in the case of the object of (2) and (3). Therefore, it is difficult to estimate the position and the orientation of the camera with practical calculation time.

Figure 1:
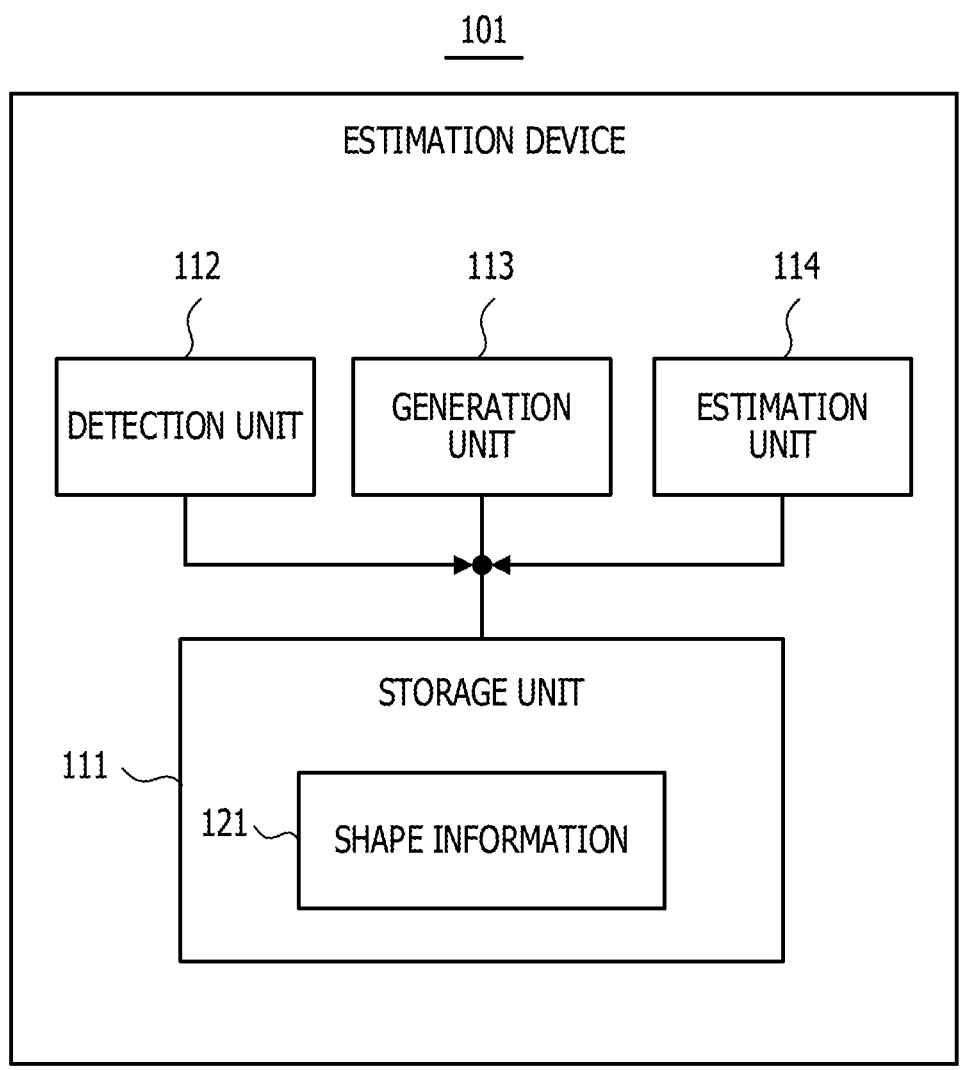
FIG. 1 is a functional configuration diagram of the estimation device.

FIG. 1 illustrates an example of a functional configuration of the estimation device of the embodiment. An estimation device 101 in FIG. 1 includes a storage unit 111, a detection unit 112, a generation unit 113, and an estimation unit 114. The storage unit 111 stores shape information 121 including a plurality of line segments representing the shape of the object.

Figure 2:
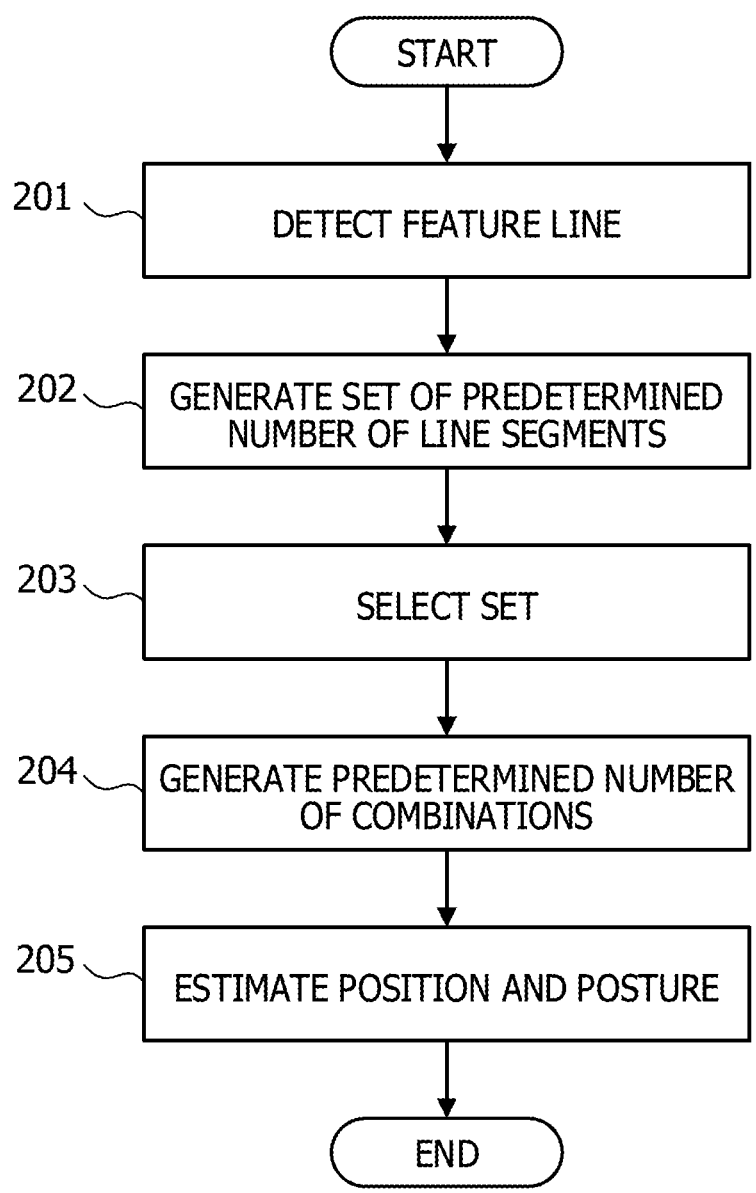
FIG. 2 is a flowchart of an estimation process.

FIG. 2 is a flowchart illustrating an example of estimation process performed by the estimation device 101 in FIG. 1. First, the detection unit 112 detects a plurality of feature lines from the image of the object photographed by an imaging device (step 201).

Next, the generation unit 113 generates a plurality of sets of a predetermined number of line segments among a plurality of line segments included in the shape information 121 (step 202). The generation unit 113 selects the set to be processed from among a plurality of sets of line segments based on the length-first selection order in which a line segment that is longer than the other line segments is preferentially selected (step 203).

Next, the generation unit 113 generates f a predetermined number of combinations in which each of a predetermined number of line segments included in the set to be processed and a predetermined number of feature lines among a plurality of feature lines are associated with each other (step 204). The estimation unit 114 estimates the position and the orientation of the imaging device in the three-dimensional space using a predetermined number of combinations (step 205).

According to such an estimation device 101, when estimating the position and the orientation of the imaging device, it is possible to reduce the amount of calculation for associating the image of the object with the shape information representing the shape of the object.

Figure 3:
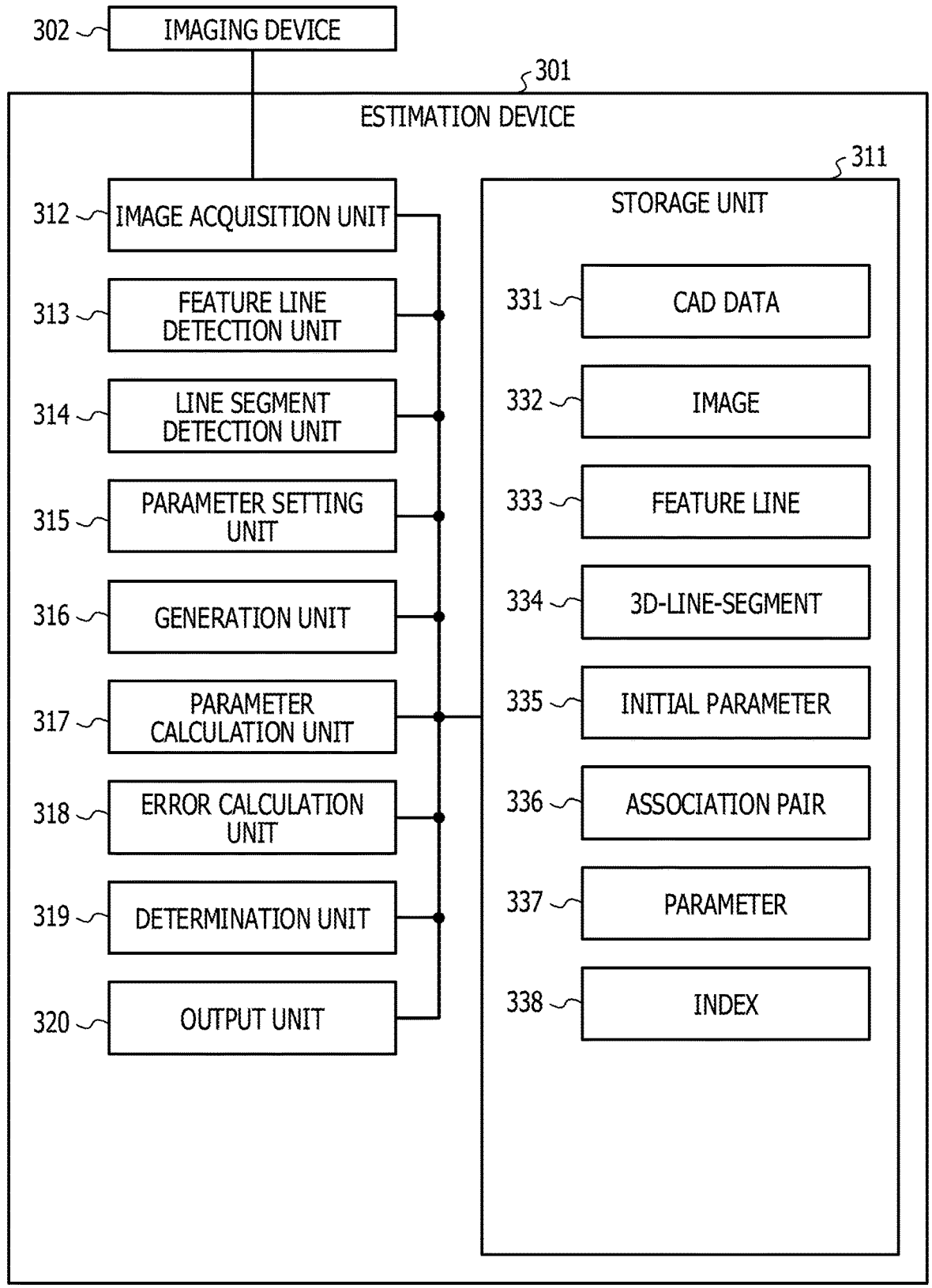
FIG. 3 is a functional configuration diagram illustrating a first specific example of the estimation device.

FIG. 3 illustrates a first specific example of the estimation device 101 in FIG. 1. An estimation device 301 in FIG. 3 includes a storage unit 311, an image acquisition unit 312, a feature line detection unit 313, a line segment detection unit 314, a parameter setting unit 315, a generation unit 316, a parameter calculation unit 317, an error calculation unit 318, a determination unit 319, and an output unit 320.

The storage unit 311 corresponds to the storage unit 111 in FIG. 1, the feature line detection unit 313 corresponds to the detection unit 112, the generation unit 316 corresponds to the generation unit 113, and the parameter calculation unit 317, the error calculation unit 318, and the determination unit 319 correspond to the estimation unit 114.

The estimation device 301 may be a mobile terminal device such as a tablet, a notebook personal computer (PC), a smart device, or the like, or an information processing apparatus such as a desktop PC.

The storage unit 311 stores CAD data 331. The CAD data 331 corresponds to the shape information 121 in FIG. 1, and includes vertex information of a plurality of vertices representing the three-dimensional shape of the object, and line segment information of a plurality of line segments. The vertex information includes three-dimensional coordinates of each vertex of the object, and the line segment information includes identification information indicating vertices at both ends of each line segment, or three-dimensional coordinates of vertices at both ends of each line segment. The CAD data 331 may be OBJ format data.

FIG. 4 illustrates an example of the CAD data 331. The CAD data 331 in FIG. 4 includes an ID, a starting point, and an ending point. The ID represents identification information of a line segment, the starting point represents the three-dimensional coordinates of one end point of the line segment, and the ending point represents the three-dimensional coordinates of the other end point of the line segment.

An imaging device 302 is a camera having an image pick-up device such as a charged-coupled device (CCD), a complementary metal-oxide-semiconductor (CMOS), and captures an image 332 of the object represented by the CAD data 331. The image acquisition unit 312 acquires the image 332 from the imaging device 302 to store the acquired image 332 in the storage unit 311.

The feature line detection unit 313 performs edge detection processing to detect a plurality of edge lines from the image 332 to store the detected edge line as a feature line 333 in the storage unit 311. The feature line detection unit 313 may use, for example, the technique of Non-Patent Literature 2 to detect an edge line from the image 332. The line segment detection unit 314 detects a plurality of line segments included in the CAD data 331 to store the plurality of detected line segments as a plurality of 3D-line-segments 334 in the storage unit 311.

The parameter setting unit 315 sets an initial parameter 335 indicating the initial position and the initial orientation of the imaging device 302 in the three-dimensional space. First, the parameter setting unit 315 projects the object represented by the CAD data 331 onto the image 332, and displays the image 332 and the shape of the object on the screen.

Figure 5:
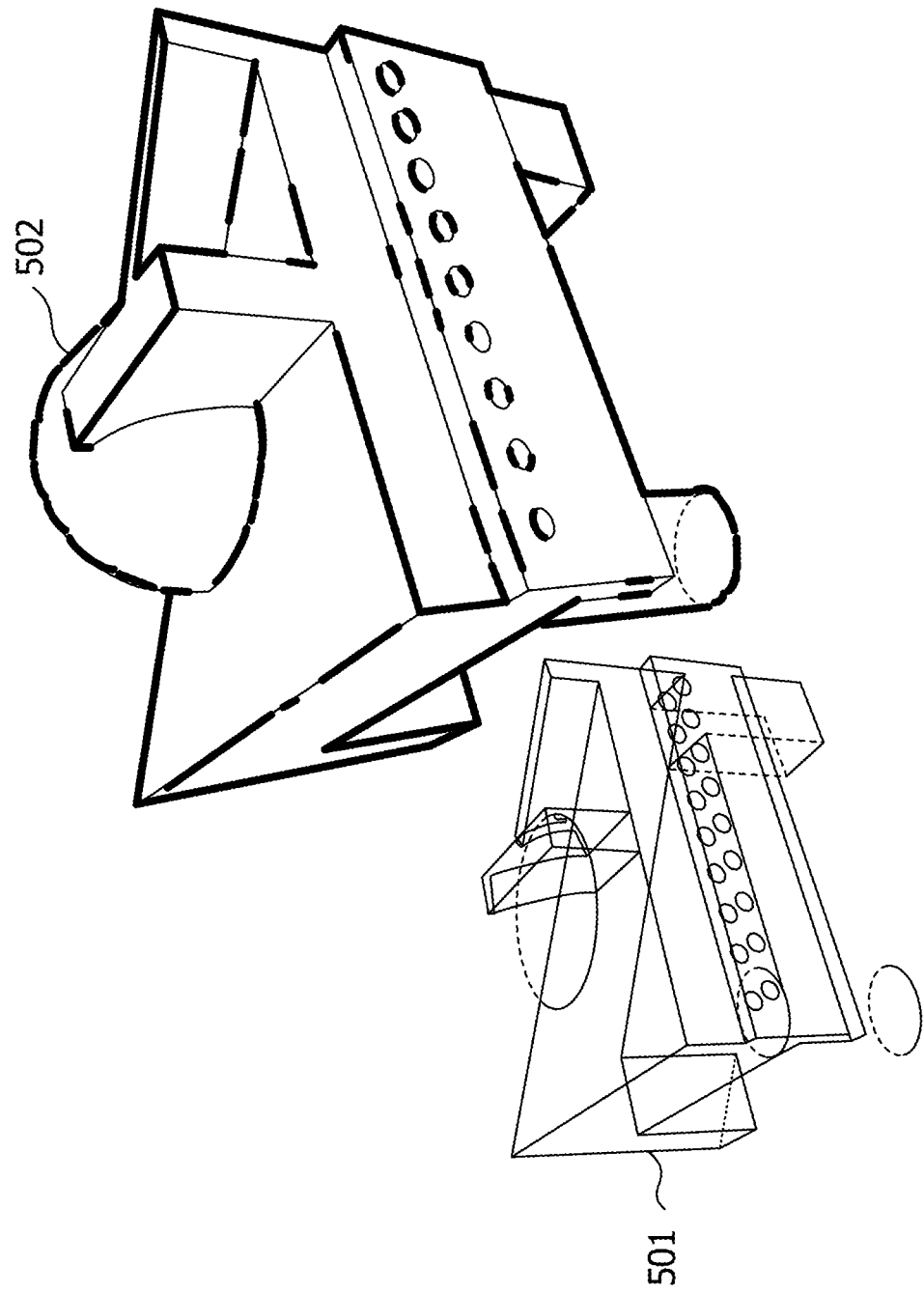
FIG. 5 is a diagram illustrating an image displayed on a screen.

FIG. 5 illustrates an example of the image 332 and the shape of the object displayed on the screen. An object 502 in the image 332 is displayed in the center of the screen, and the feature lines 333 detected from the object 502 is displayed on the object 502. The shape 501 of the object represented by the 3D-line-segment 334 detected from the CAD data 331 is displayed on the lower left of the object 502.

The user performs an operation of changing the position and the orientation of the shape 501 on the screen so that the position and the orientation of the shape 501 are approximate to the object 502. The position and the orientation of the viewpoint with respect to the screen change by changing the position and the orientation of the shape 501 on the screen. Therefore, the parameter setting unit 315 uses the position and the orientation of the viewpoint corresponding to the position and the orientation of the shape 501 decided by the user as the initial position and the initial orientation of the imaging device 302. The parameter setting unit 315 stores, as the initial parameter 335, the parameter representing the initial position and the initial orientation in the storage unit 311.

The generation unit 316 removes, among the 3D-line-segments included in the shape 501, a 3D-line-segment (hidden line) that is not observed from the viewpoint. The generation unit 316 may removes the hidden line, for example, using the technique of Non-Patent Literature 3.

The parameter setting unit 315 may automatically determine the initial parameter 335 using the technique described in Japanese Patent Application No. 2017-195787, which is another prior application. According to this technique, the pose information representing the position and the orientation of the object observed from each of a plurality of viewpoints in the three-dimensional space, a viewpoint image of the observed object, and the feature amount extracted from the viewpoint image are stored in the storage unit in association with each other. The degree of similarity between the feature amount of the image captured by the imaging device and the feature amount of each viewpoint image is calculated, and the pose information of the viewpoint image having the maximum degree of similarity is determined as the pose information representing the initial position and the initial orientation of the object.

The initial position and the initial orientation represented by the initial parameter 335 are a temporary position and a temporary orientation, and may or may not match the position and the orientation of the imaging device 302 at which the image 332 is captured.

The generation unit 316 generates a plurality of sets of k 3D-line-segments of (k is an integer of 4 or more) among the remaining 3D-line-segments, which are obtained by removing the hidden line from the 3D-line-segments. Hereinafter, a set of k 3D-line-segments may be referred to as the set of k. The generation unit 316 selects the set of k to be processed from among a plurality of sets of k based on the following selection order.

(S1) Length-First Selection Order

In the length-first selection order, a 3D-line-segment which is longer than the other 3D-line-segments are preferentially selected. The longer the 3D-line-segment is, the further the calculation accuracy with respect to the angle between the 3D-line-segments is improved, so that the accuracy of association between the 3D-line-segment with the angle and the feature line is improved.

(S2) Distance-First Selection Order

In the distance-first selection order, a pair of 3D-line-segments that has a more distance between the 3D-line-segments than the other pairs of 3D-line-segments is preferentially selected. The more distant the two 3D-line-segments is, the further the overall positional deviation of 3D-line-segments included in the set of k is reduced, so that the accuracy of association between the 3D-line-segments and the feature lines is improved.

(S3) Spatial-Distribution-First Selection Order

In the spatial-distribution-first selection order, a pair of 3D-line-segments where the 3D-line-segments do not exist on the same plane are more preferentially selected than a pair of 3D-line-segments where the 3D-line-segments exist on the same plane. In a case where two 3D-line-segments exist on the same plane, the positional deviation in the direction perpendicular to the plane increases. On the other hand, in a case where the two 3D-line-segments do not exist on the same plane, the positional deviation in the direction perpendicular to the plane decreases, so that the accuracy of association between the 3D-line-segments and the feature lines is improved.

FIGS. 6A, 6B, and 6C illustrate an example of a projection line obtained by projecting the 3D-line-segment included in the shape 501 in FIG. 5 onto the image 332. FIG. 6A illustrates a projection line 601 of a short 3D-line-segment, and a projection line 602 of a long 3D-line-segment. According to the length-first selection order, the long 3D-line-segment is more preferentially selected than the short 3D-line-segment.

FIG. 6B illustrates a projection line 604 of a 3D-line-segment whose distance from the 3D-line-segment represented by a projection line 603 is short, and a projection line 605 of a 3D-line-segment whose distance from the 3D-line-segment represented by the projection line 603 is away. According to the distance-first selection order, the pair of 3D-line-segments represented by the projection line 603 and the projection line 605 is more preferentially selected than the pair of 3D-line-segments represented by the projection line 603 and the projection line 604.

FIG. 6C illustrates a projection line 606 which exists on the same plane as the 3D-line-segment represented by the projection line 603 where the 3D-line-segment of the projection line 606 is parallel to the 3D-line-segment represented by the projection line 603, and the projection line 602 of a 3D-line-segment which does not exist on the same plane as the 3D-line-segment represented by the projection line 603. According to the spatial-distribution-first selection order, the pair of 3D-line-segments represented by the projection line 603 and the projection line 602 is more preferentially selected than the pair of 3D-line-segments represented by the projection line 603 and the projection line 606.

The generation unit 316 may select the set of k to be processed based on any one of the length-first selection order, the distance-first selection order, and the spatialdistribution-first selection order, or may select the set of k to be processed based on a combination of two or three selection orders. For example, when using the weighted sum of three selection orders, the generation unit 316 may select the set of k to be processed in the following procedure.

(P1) In a case where the number of remaining 3D-line-segments, which are obtained by removing the hidden line from the 3D-line-segments, is n, the generation unit 316 generates $_nP_k$ sets of k by selecting k 3D-line-segments from among n 3D-line-segments in consideration of the order.

(P2) The generation unit 316 calculates the sum of the lengths of the 3D-line-segments included in each set of k, and allocates a rank G1 in descending order of the sum of lengths for each set of k.

(P3) The generation unit 316 generates $_kC_2$ pairs of 3D-line-segments for each set of k, and calculates a distance between two 3D-line-segments included in each pair of 3D-line-segments, and allocates a rank G2 in descending order of the sum of the $_kC_2$ distances for each set of k.

(P4) The generation unit 316 calculates direction vectors of 3D-line-segments included in each set of k, and generates a matrix of 3 rows and k columns with each direction vector as a column vector. The generation unit 316 calculates the condition number of the generated matrix, and allocates a rank G3 to each set of k in ascending order of the condition number. As the condition number is small, the possibility that the 3D-line-segments included in the set of k is on the same plane decreases.

(P5) The generation unit 316 calculates the weighted sum GS of the rank G1 to the rank G3 by the following Equation, and sorts $_nP_k$ sets of k in ascending order of the weighted sum GS.

$$GS = W1*G1 + W2*G2 + W3*G3 \quad (1)$$

W1 to W3 in Expression (1) represent weights for the rank G1 to rank G3, respectively. The generation unit 316 makes small the weight for the rank whose importance is high among the rank G1 to the rank G3, and makes large the weight for the rank whose importance is low. In a case where the importance of all the ranks is comparable, the generation unit 316 sets W1=W2=W3=1.

Next, the generation unit 316 selects the set of k in order beginning from that of the highest rank among $_nP_k$ sets of k that have been sorted, and generates a set of k feature lines 333 to be associated with the selected set of k. At this time, the generation unit 316 projects the 3D-line-segments included in the set of k onto the image 332 by the following Equation using the initial parameter 335.

$$\begin{pmatrix} u \\ v \\ 1 \end{pmatrix} = A \begin{pmatrix} R & T \\ 0 & 1 \end{pmatrix} \begin{pmatrix} X \\ Y \\ Z \\ 1 \end{pmatrix} \quad (2)$$

The definitions of (X, Y, Z), A, R, T, and (u, v) in Expression (2) are as follows.

(X, Y, Z): three-dimensional coordinates of end point of the 3D-line-segment

A: Internal parameter of the imaging device 302

R: Rotation matrix of 3 rows and 3 columns represented by the initial parameter 335

T: Translation vector represented by the initial parameter 335

(u, v): Two-dimensional coordinates of the end point of the projection line on the image 332

The internal parameter A of the imaging device 302 may be measured in advance using, for example, the technique of Non-Patent Literature 1.

In a case where the number of feature lines detected from the image 332 is m, the generation unit 316 selects k feature lines out of m feature lines based on the angles of the projection lines included in the k projection lines. For example, the generation unit 316 selects a plurality of sets of k feature line candidates out of the m feature lines, and calculates the difference between the angle between projection lines and the angle between the feature line candidates included in each of the plurality of selected sets. The generation unit 316 selects a set having differences smaller than a threshold as the k feature lines. Hereinafter, a set of k feature lines may be referred to as the set of k.

Figure 7:
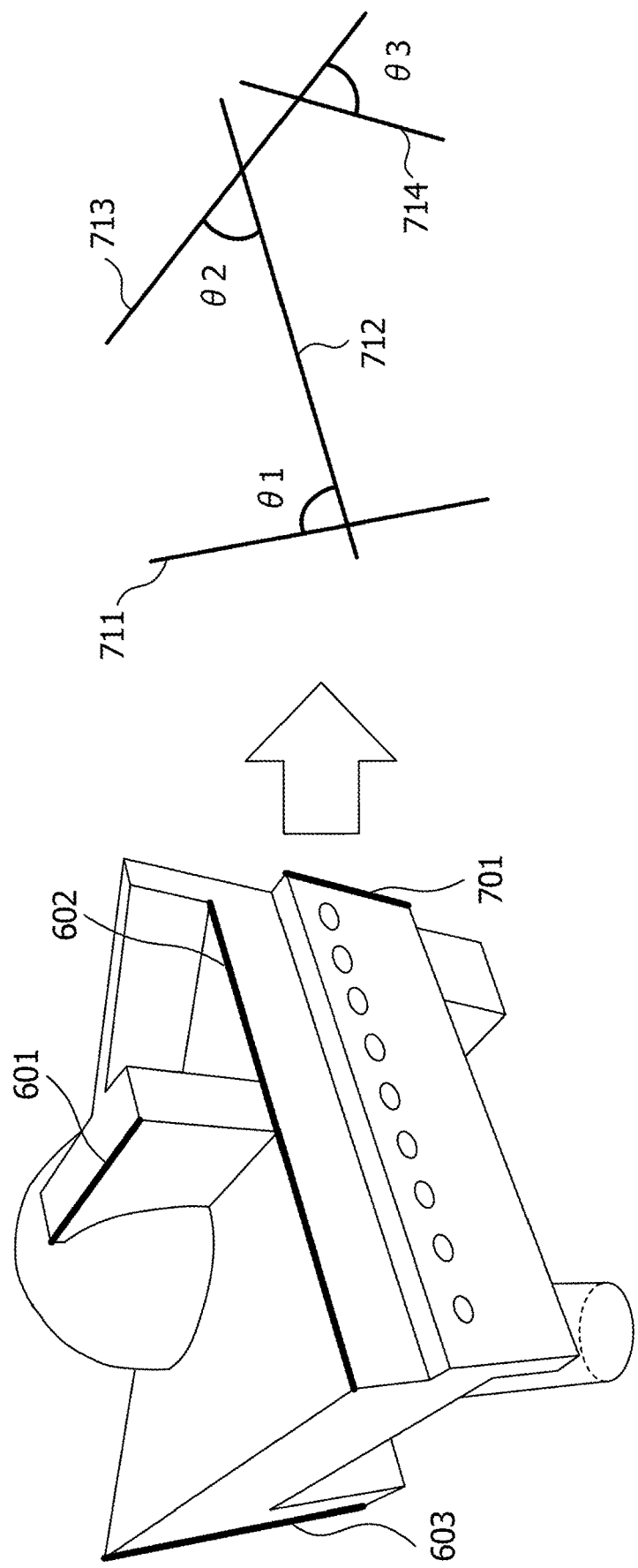
FIG. 7 is a diagram illustrating a set of four projection lines.

FIG. 7 illustrates an example of a set of four projection lines generated from 3D-line-segments included in the shape 501 in FIG. 5 when k=4. The projection line 601 to the projection line 603, and a projection line 701 correspond to a set of four projection lines. A straight line 711 is a straight line including the projection line 603, a straight line 712 is a straight line including the projection line 602, a straight line 713 is a straight line including the projection line 601, and a straight line 714 is a straight line including the projection line 701. In this case, the angles between projection lines are as follows.

The angle between the projection line 603 and the projection line 602: θ1=85°

The angle between the projection line 602 and the projection line 601: θ2=75°

The angle between the projection line 601 and the projection line 701: θ3=65°

The generation unit 316 extracts the high ranked h feature lines in descending order beginning from the feature line with the longer length among the m feature lines, and selects k feature lines from among the h feature lines in consideration of the order, thereby generating $_hP_k$ sets of k. In the same manner as in FIG. 7, the generation unit 316 obtains the angle between the feature line candidates included in each set of k and compares the angle between the feature line candidates with the angle between the projection lines to determine whether to use the set of k as the set to be associated.

FIGS. 8A, and 8B illustrate an example of a set of four generated from the feature lines included in the object 502 in FIG. 5 when k=4. FIG. 8A illustrates an example of a set of four used as the set to be associated. The angles of the feature line candidates included in the set of four are as follows.

The angle between a feature line candidate 801 and a feature line candidate 802: α1=83°

The angle between the feature line candidate 802 and a feature line candidate 803: α2=76°

The angle between the feature line candidate 803 and a feature line candidate 804: α3=67°

Therefore, the difference between the angle between the projection lines and the angle between the feature line candidates is calculated as follows.

|θ1−α1|=2°

|θ2−α2|=1°

|θ3−α3|=2°

For example, in a case where the threshold for the angle difference is 5°, since any difference is smaller than the threshold, the feature line candidate 801 to the feature line candidate 804 are used as the set of four to be associated.

FIG. 8B illustrates an example of a set of four that are not used as the set to be associated. The angles of the feature line candidates included in the set of four are as follows.

The angle between the feature line candidate 801 and a feature line candidate 805: α1=21°

The angle between the feature line candidate 805 and the feature line candidate 803: α2=18°

Angle between the feature line candidate 803 and a feature line candidate 804: α3=67°

Therefore, the difference between the angle between the projection lines and the angle between the feature line candidates is calculated as follows.

|θ1−α1|=64°
|θ2−α2|=57°
|θ3−α3|=2°

In this case, since |θ1−α1| and |θ2−α2| are greater than or equal to the threshold, the feature line candidate 801, and the feature line candidate 803 to the feature line candidate 805 are not used as the set of four to be associated.

FIG. 9 illustrates an example of a determination result for the set of four feature line candidates. The rank represents the rank of the sets of four 3D-line-segments sorted in ascending order of the weighted sum GS, and line segments ID1 to ID4 represent identification information of four 3D-line-segments included in each set of four. Feature line ID1 to feature line ID4 represent identification information of four feature line candidates included in a set of four feature line candidates, and the determination result indicates whether each set of four is used as the set to be associated. The symbol "O" indicates that the set of four is to be used as the set to be associated, and the symbol "×" indicates that the set of four is not to be used as the set to be associated.

It is unnecessary to use all of |θ1−θ1| to |θ3−α3|. Only one or two of |θ1−α1| to |θ3−α3| may be used for determination.

Next, the generation unit 316 generates k combinations in which each 3D-line-segment included in the set of k 3D-line-segments and each feature line included in the set of k used as the set to be associated are associated with each other. The generation unit 316 stores the k generated combinations as the set of k association pairs 336 in the storage unit 311.

The parameter calculation unit 317 selects the set of k association pairs in order beginning from the set of k association pairs including the set of k 3D-line-segments of the highest rank, and calculates the position and the orientation of the imaging device 302 when the image 332 is captured using the set of k association pairs which has been selected. The parameter calculation unit 317 stores the parameter representing the calculated position and orientation in the storage unit 311 as the parameter 337. The parameter calculation unit 317 calculates R and T in Equation (2) from the set of k association pairs using, for example, the technique of Non-Patent Literature 4, and may use the calculated R and T as the parameter 337.

While changing the selection of the set of k association pairs, the parameter calculation unit 317 repeats the process of calculating the parameter 337 a plurality of times. Every time the parameter 337 is calculated, the determination unit 319 uses R and T represented by the parameter 337 to project the 3D-line-segment included in the set of k association pairs selected by the parameter calculation unit 317 onto the image 332, thereby generating k projection lines.

The error calculation unit 318 calculates an error representing a deviation between the position of the projection line generated by the determination unit 319 and the position of the feature line included in the association pair and calculates the sum of errors between the positions of k projection lines and the positions of k feature lines. The error calculation unit 318 stores the sum of the calculated errors in the storage unit 311 as an index 338. In a case where a square error is used with respect to an error between the position of the projection line and the position of the feature line, the sum E of square errors is calculated by the following Equation.

$$E=\Sigma_{i=1}^{k}(Ei)^2 \quad (3)$$

Ei (i=1 to k) in Expression (3) represents an error between the position of the projection line included in the i-th association pair and the position of the feature line.

Figure 10:
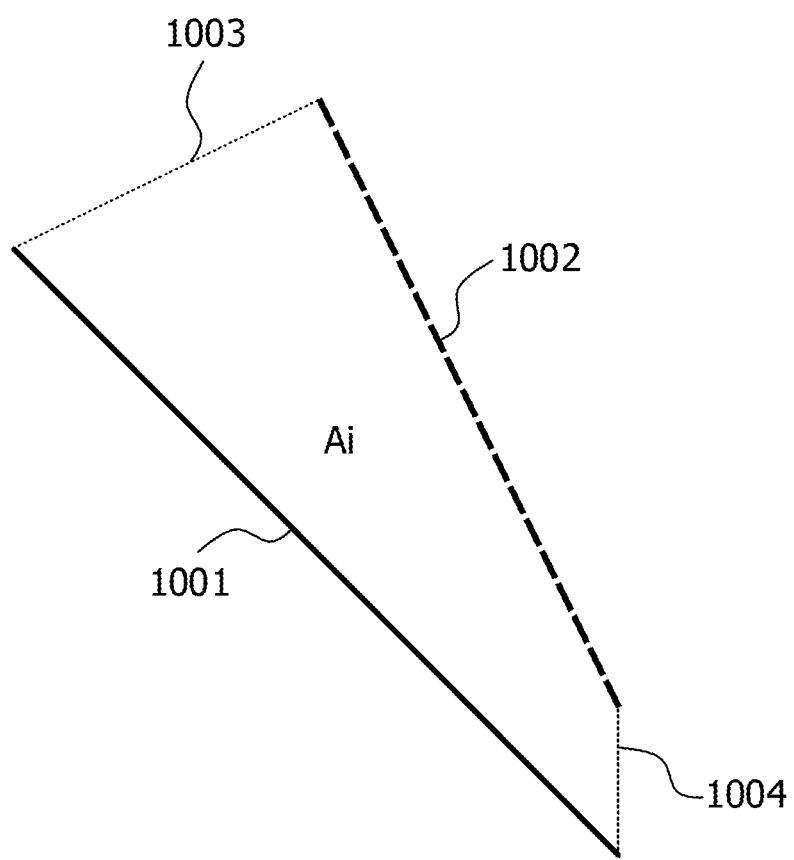
FIG. 10 is a diagram illustrating a method of calculating an error based on an area.

FIG. 10 illustrates an example of a method of calculating the error Ei based on the area of the region between the projection line and the feature line. In a case where the projection line included in the i-th association pair is a line segment 1001, and the feature line is a line segment 1002, a line segment 1003 obtained by connecting one end of the line segment 1001 and one end of the line segment 1002 and a line segment 1004 obtained by connecting the other end of the line segment 1001 and the other end of the line segment 1002 may be defined. In this case, the area Ai of the region surrounded by the line segment 1001 to the line segment 1004 may be used as the error Ei.

$$Ei=Ai \quad (4)$$

The smaller the area Ai is, the smaller the error Ei is. In a case where the line segment 1001 overlaps the line segment 1002, the error Ei is zero.

Figure 11:
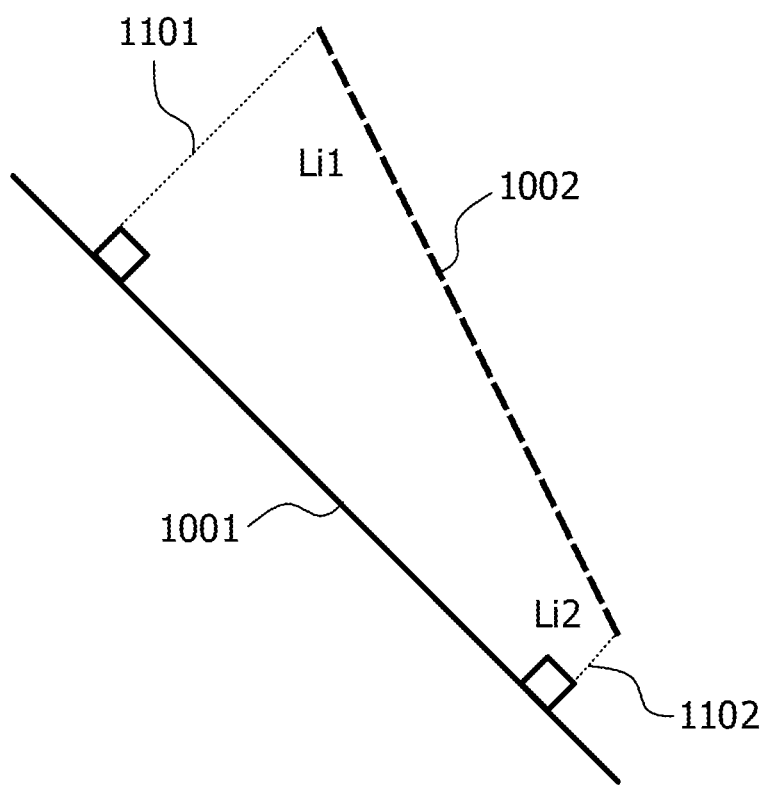
FIG. 11 is a diagram illustrating a method of calculating errors based on a distance.

FIG. 11 illustrates an example of a method of calculating the error Ei based on the distance between the projection line and the feature line. The respective lengths of the perpendicular line 1101 and the perpendicular line 1102 each of which is a line perpendicular to the line segment 1001 and extending from respective ends of the line segment 1002 to the line segment 1001 are denoted as Li1 and Li2. In this case, the sum of Li1 and Li2 may be used as the error Ei.

$$Ei=Li1+Li2 \quad (5)$$

The shorter Li1 and Li2 are, the smaller the error Ei is. In a case where the line segment 1001 overlaps the line segment 1002, the error Ei is zero.

Next, the determination unit 319 determines, based on the index 338 calculated using the respective parameters 337, determines the set of k association pairs in which the sum of the errors is minimized. The output unit 320 outputs the parameter 337 calculated from the determined set of k association pairs as the estimation result of the position and the orientation of the imaging device 302.

The estimation device 301 in FIG. 3 determines the rank of the set of k 3D-line-segments according to a predetermined selection order, whereby it is possible to select the set of k association pairs in descending order of the accuracy of association to obtain the estimation result with a small error in a short time.

The set of k feature lines is selected such that the difference between the angle of the projection lines and the angle of the feature lines is smaller than the threshold with respect to the set of k 3D-line-segments, thereby improving the accuracy of association. Thus, it is possible to effectively narrow down the set of k association pairs to be processed.

Therefore, the amount of calculation for determining the set of k association pairs is reduced, and it is possible to reach a quasi-optimal solution of the position and the orientation of the imaging device 302 with practical calculation time.

Figure 12:
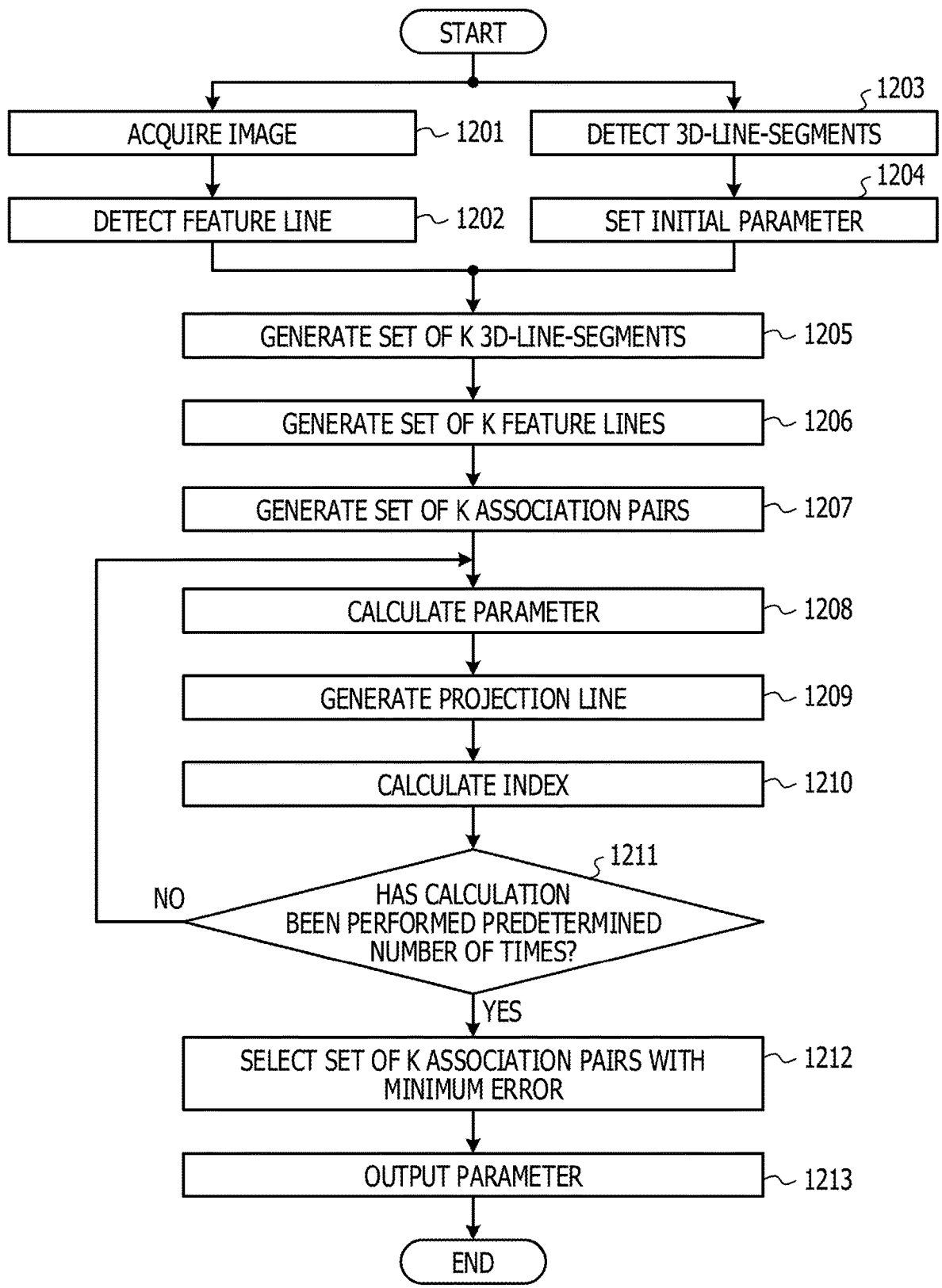
FIG. 12 is a flowchart illustrating a first specific example of an estimation process.

FIG. 12 is a flowchart illustrating a first specific example of the estimation process performed by the estimation device 301 in FIG. 3. First, the image acquisition unit 312 acquires the image 332 from the imaging device 302 (step 1201), and the feature line detection unit 313 detects a plurality of feature lines 333 from the image 332 (step 1202).

The line segment detection unit 314 detects a plurality of 3D-line-segments 334 from the CAD data 331 (step 1203), and the parameter setting unit 315 sets the initial parameter 335 representing the initial position and the initial orientation of the imaging device 302 (step 1204).

Next, the generation unit 316 removes the hidden line from the 3D-line-segments 334, generates a plurality of sets of k from the remaining 3D-line-segments, and sorts the plurality of sets of k in ascending order of the weighted sum GS (step 1205). Next, the generation unit 316 selects the sorted set of k in order beginning from that of the highest rank, and generates the set of k feature lines to be associated with the selected set of k (step 1206). The generation unit 612 generates plural sets of k association pairs 336 in which the set of k 3D-line-segments and the set of k feature lines are associated with each other (step 1207).

Next, the parameter calculation unit 317 selects a set of k association pairs in order beginning from the set of k association pairs including the set of k the uppermost 3D-line-segments of the highest rank, and calculates the parameter 337 using the set of k association pairs which has been selected (step 1208). Using the parameter 337, the determination unit 319 projects the 3D-line-segment included in the selected set of k association pairs on the image 332, thereby generating k projection lines (step 1209).

Next, the error calculation unit 318 calculates the index 338 representing the sum of the errors between the positions of the k projection lines and the positions of the k feature lines (step 1210).

Next, the parameter calculation unit 317 checks whether the calculation of the parameter 337 has been performed a predetermined number of times (step 1211). In a case where the calculation of the parameter 337 has not been performed a predetermined number of times ("NO" in step 1211), the estimation device 301 repeats the process after step 1208 with respect to the set of k association pairs including the set of k 3D-line-segments of the next rank.

In a case where the calculation of the parameter 337 has been performed a predetermined number of times ("YES" in step 1211), the determination unit 319 selects the set of k association pairs in which the sum of errors represented by the index 338 is minimized (step 1212). The output unit 320 outputs the parameter 337 calculated from the selected set of k association pairs as the estimation result of the position and the orientation of the imaging device 302 (step 1213).

In step 1211, instead of terminating the iterative process when the parameter 337 is calculated a predetermined number of times, the estimation device 301 may terminate the iterative process when a predetermined time has elapsed from the start of the process. The estimation device 301 may terminate the iterative process when the sum of the errors represented by the index 338 is smaller than a predetermined value.

According to the estimation process in FIG. 12, since the set of k association pairs is selected in descending order of the accuracy of association and the parameter 337 is calculated, it is possible to obtain a quasi-optimal solution of the position and the orientation of the imaging device 302 at high speed. For example, in a case where a time limit of 30 seconds is set, the number of sets of four 3D-line-segments for which the parameter 337 may be calculated within the time limit is only one in the estimation process of Japanese Patent Application No. 2016-187515. On the other hand, according to the estimation process in FIG. 12, since the number of sets of k feature lines to be calculated is reduced, the number of sets of four 3D-line-segments for which the parameter 337 may be calculated within the time limit increases to about 10 sets. Therefore, the calculation time per set of four 3D-line-segments is reduced to about $\frac{1}{10}$.

In step 1205 of FIG. 12, the generation unit 316 may sort the 3D-line-segments in the length-first selection order and generate the set of k from the sorted 3D-line-segments. For example, when k=4, a set of four 3D-line-segments is generated by the following procedure.

(P11) The generation unit 316 sorts the remaining 3D-line-segments, which are obtained by removing the hidden line from the 3D-line-segments, in descending order of length.

(P12) The generation unit 316 sets j=1.

(P13) The generation unit 316 selects the first to (j+3)-th 3D-line-segments among the sorted 3D-line-segments.

(P14) The generation unit 316 selects three 3D-line-segments out of the first to (j+2)-th 3D-line-segments, and generates $_{j+2}C_3$ combinations.

(P15) The generation unit 316 adds the (j+3)-th 3D-line-segment to each combination, and generates $_{j+2}C_3$ sets of four.

(P16) The generation unit 316 sorts $_{j+2}C_3$ sets of four in ascending order of the weighted sum GS, and adds the set of four after sorting to the list of the set of four 3D-line-segments.

(P17) The generation unit 316 sets j=j+1 and repeats the processes after (P13). In a case where all the 3D-line-segments are selected, the process ends.

FIG. 13 illustrates an example of a process of generating a list of the set of four from six 3D-line-segments. The 3D-line-segment a to the 3D-line-segment f are sorted in descending order of length. First, when j=1, 3D-line-segment a to 3D-line-segment d are selected among the 3D-line-segment a to the 3D-line-segment d, and a set of four of abcd is generated and added to the list of the set of four.

Next, when j=2, the 3D-line-segment a to the 3D-line-segment e among the 3D-line-segment a to the 3D-line-segment f are selected. The following four sets of four are generated, sorted in ascending order of the weighted sum GS, and then added to the list of the set of four.

abce, abde, acde, bcde

Next, when j=3, all of the 3D-line-segment a to the 3D-line-segment f are selected. The following ten sets of four are generated, sorted in ascending order of the weighted sum GS, and then added to the list of the set of four.

abcf, abdf, abef, acdf, acef, adef, bcdf, bcef, bdef, cdef

According to such a sorting method, it is possible to sort the sets of four 3D-line-segments while importance is given to the length of the 3D-line-segment, and the distance between 3D-line-segments and the spatial distribution of the 3D-line-segments are taken into consideration.

FIGS. 14A, 14B, and 14C illustrate an example of the error when estimation process is performed by changing the sorting method of a set of four 3D-line-segments. In this example, an edge loss occurs in some long feature lines among the feature lines detected from the image 332, so that it is assumed that it is difficult to associate the corresponding long 3D-line-segment with the feature line where the edge loss occurs.

In FIG. 14A, an example of an error when the sets of four 3D-line-segments are sorted based on only length-first selection order is illustrated. The line segment ID of each of the four 3D-line-segments is illustrated in the column of the set of four, and the minimum value of the sum of the errors represented by the index 338 is illustrated in the column of error minimum value. In this case, an edge loss occurs on the long side of the object corresponding to the long 3D-line-segment of line segment ID "1" and the long 3D-line-segment is included in the top ten sets of four after sorting. Among them, the error minimum value for the top three sets of four is a considerably large.

FIG. 14B illustrates an example of errors where the sets of four 3D-line-segments are sorted by the procedure of (P1) to (P5). Also in this case, the 3D-line-segment of line segment ID "1" is included in the top five set of four after sorting, and the error minimum value is a considerably large.

FIG. 14C illustrates an example of errors where the sets of four 3D-line-segments are sorted by the procedure of (P11) to (P17). In this case, since the 3D-line-segment of line segment ID "1" is not included in the fourth set of four after sorting beginning from the highest rank and all four association pairs are correctly associated, the error minimum value is small. Therefore, even when an edge loss occurs on a side corresponding to the 3D-line-segment of line segment ID "1", the association pair in which no edge loss occurs is selected in the early stage of the estimation process, so that it is possible to obtain an estimation result with a small error in a short time.

Figure 15:
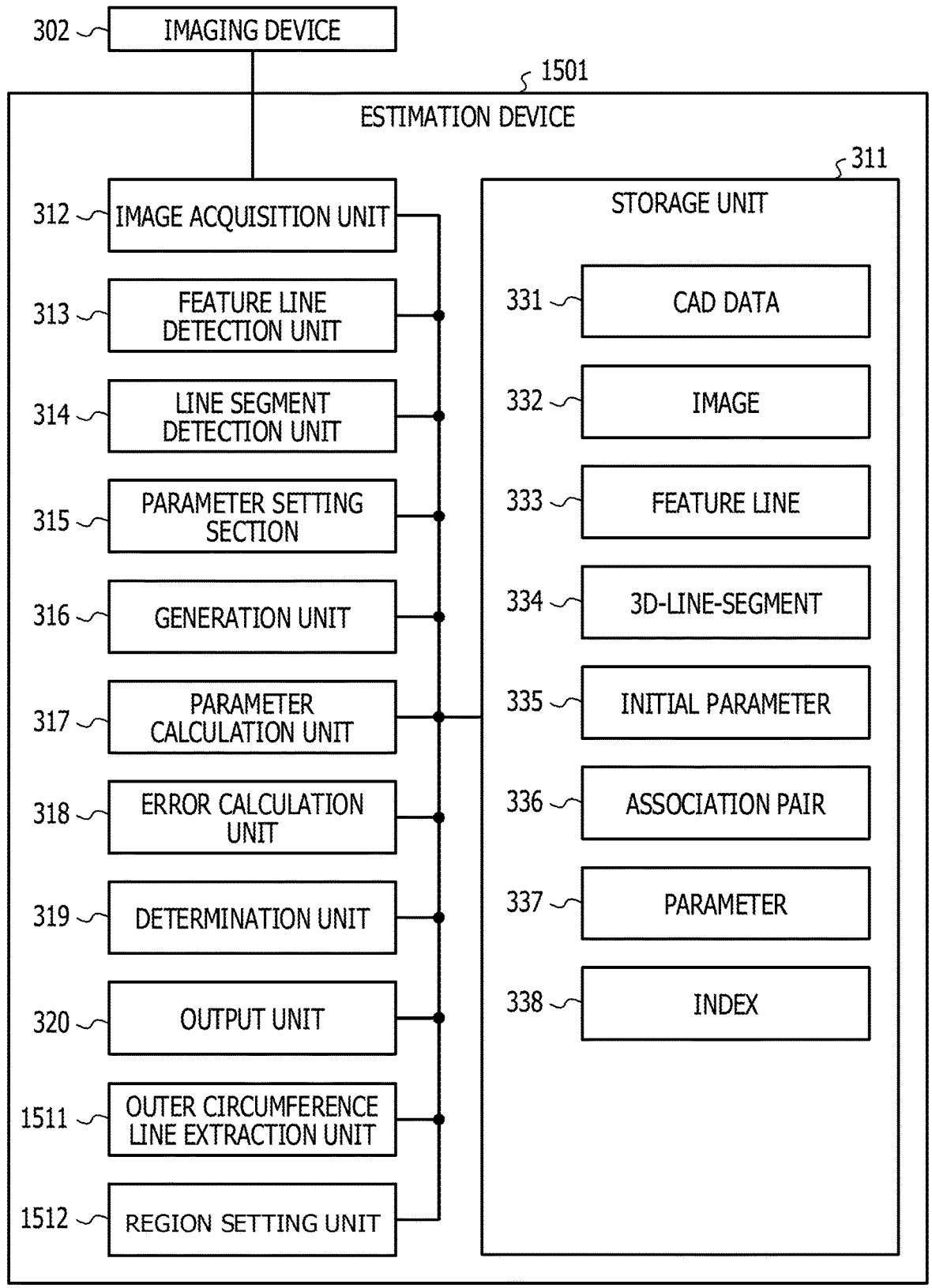
FIG. 15 is a functional configuration diagram illustrating a second specific example of the estimation device.

FIG. 15 illustrates a second specific example of the estimation device 101 in FIG. 1. The estimation device 1501 in FIG. 15 has a configuration in which an outer circumference line extraction unit 1511 and a region setting unit 1512 are added to the estimation device 301 in FIG. 3.

The outer circumference line extraction unit 1511 projects the remaining 3D-line-segments, which are obtained by removing the hidden line from the 3D-line-segments, onto the image 332 using the initial parameter 335 to generate a plurality of projection lines, and extracts a projection line representing the outer circumference of the object among the plurality of projection lines as an outer circumference line.

The generation unit 316 selects the set of k from among the 3D-line-segments corresponding to the outer circumference line. For example, in a case where the number of 3D-line-segments corresponding to the outer circumference lines is larger than the predetermined number, the generation unit 316 may select the set of k from among these 3D-line-segments. On the other hand, in a case where the number of 3D-line-segments corresponding to the outer circumference lines is equal to or smaller than the predetermined number, the generation unit 316 selects the set of k by regarding, as the set of k to be associated, all remaining 3D-line-segments, which are obtained by removing the hidden line from the 3D-line-segments.

Since the outer circumference line of the object is often long and is often distributed away from the center of the image 332, it is likely to improve the accuracy of association. Therefore, the priority is given to the 3D-line-segment corresponding to the outer circumference line, and 3D-line-segment candidates are narrowed down, whereby it is possible to generate the association pair with the high accuracy of association to obtain an estimation result with a small error in a short time.

The region setting unit 1512 sets a designated region in the image 332. The designated region may include, for example, a region specified by a mouse operation or a touch operation by the user.

Figure 16A:
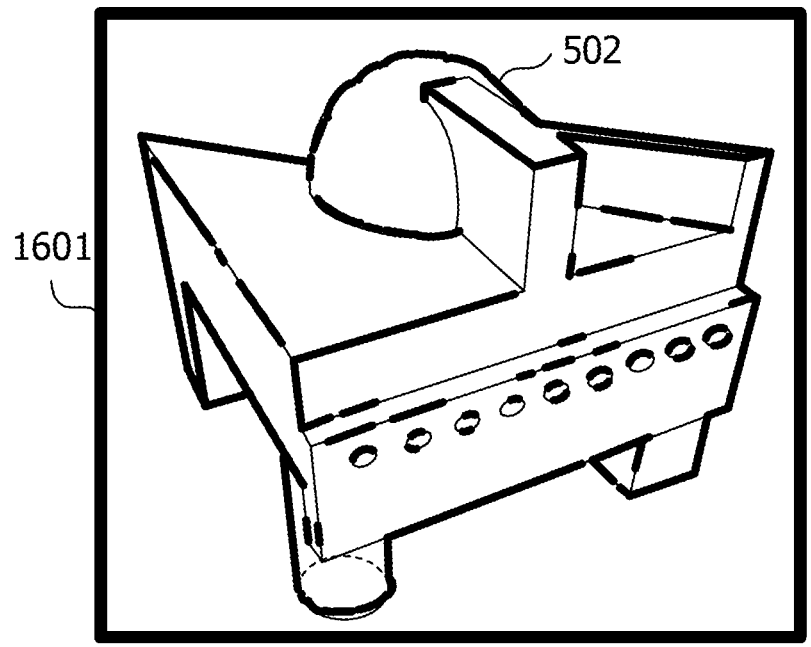
FIGS. 16A, and 16B are diagrams illustrating a designated region.
Figure 16B:
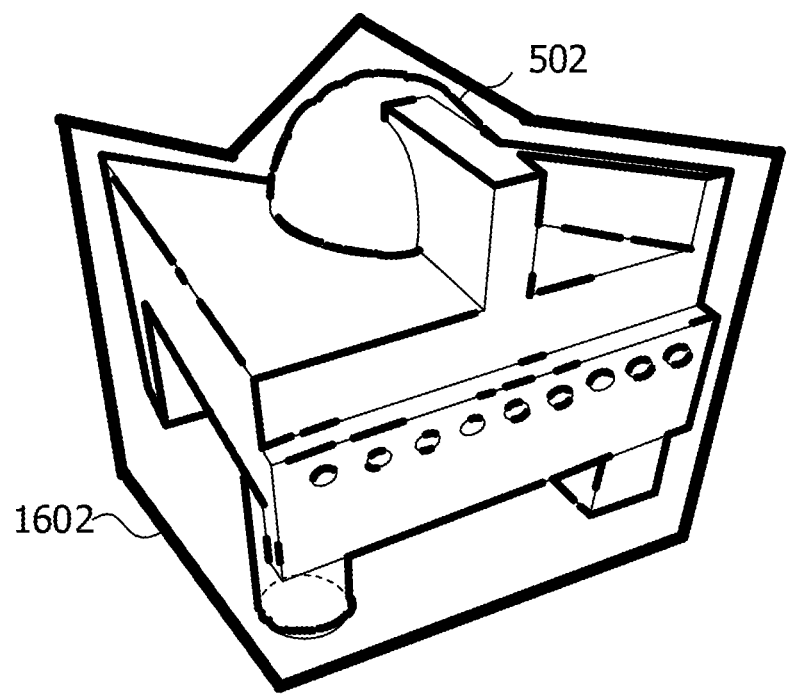

FIGS. 16A, and 16B illustrate an example of a designated region in the image 332. FIG. 16A illustrates a rectangular designated region 1601. The user encloses the object 502 in the image 332 with a rectangle line to specify the designated region 1601. FIG. 16B illustrates a polygonal designated region 1602. The user encloses the object 502 in the image 332 with a polygon line e to specify the designated region 1602.

The generation unit 316 extracts a plurality of feature lines included in the designated region from among the plurality of feature lines detected from the image 332 to select the set of k out of the extracted feature lines. In this way, the feature line candidates are narrowed down and the association pair with the high accuracy of association is generated, so that it is possible to obtain an estimation result with a small error in a short time.

Figure 17:
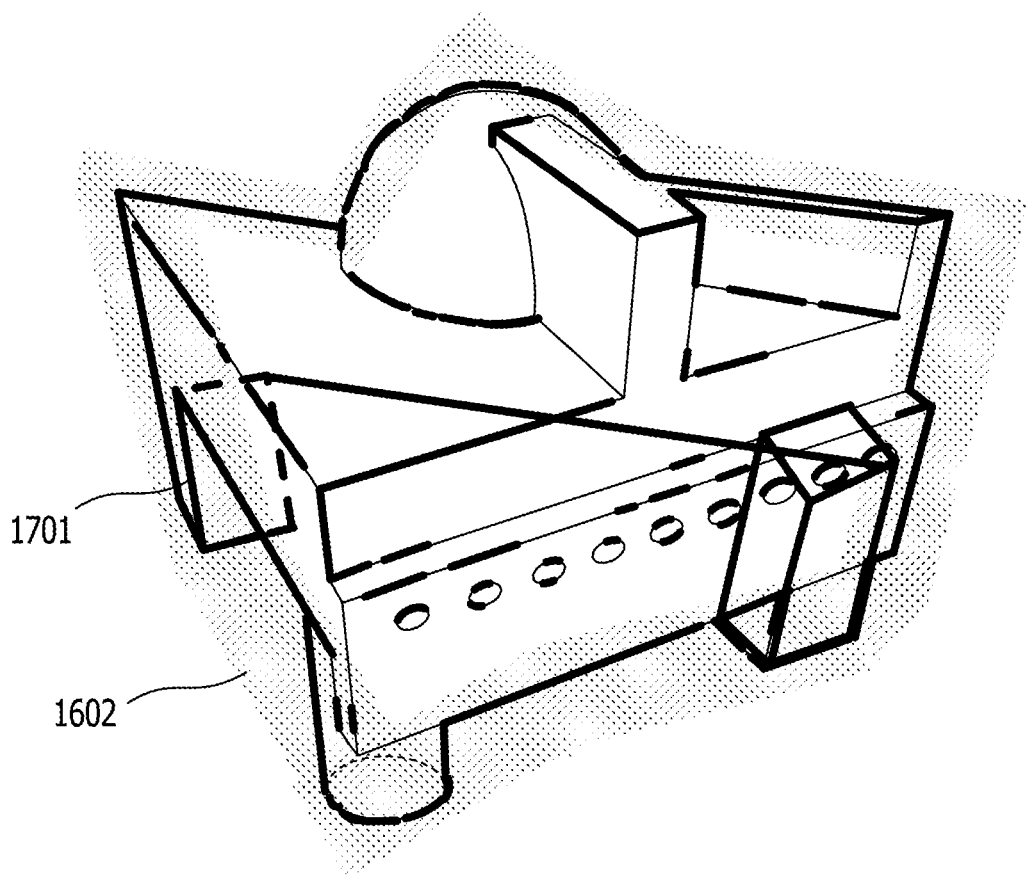
FIG. 17 is a diagram illustrating the outer edge portion of the designated region.

FIG. 17 illustrates an example of the outer edge portion of the designated region. The region setting unit 1512 sets an outer edge region 1701 having a predetermined width on the outer edge portion of the designated region 1602 in FIG. 16B. In this case, the generation unit 316 extracts a plurality of feature lines included in the outer edge region 1701 to select the set of k from the extracted feature lines. In this way, it is possible to further narrow down the feature line candidates.

Figure 18:
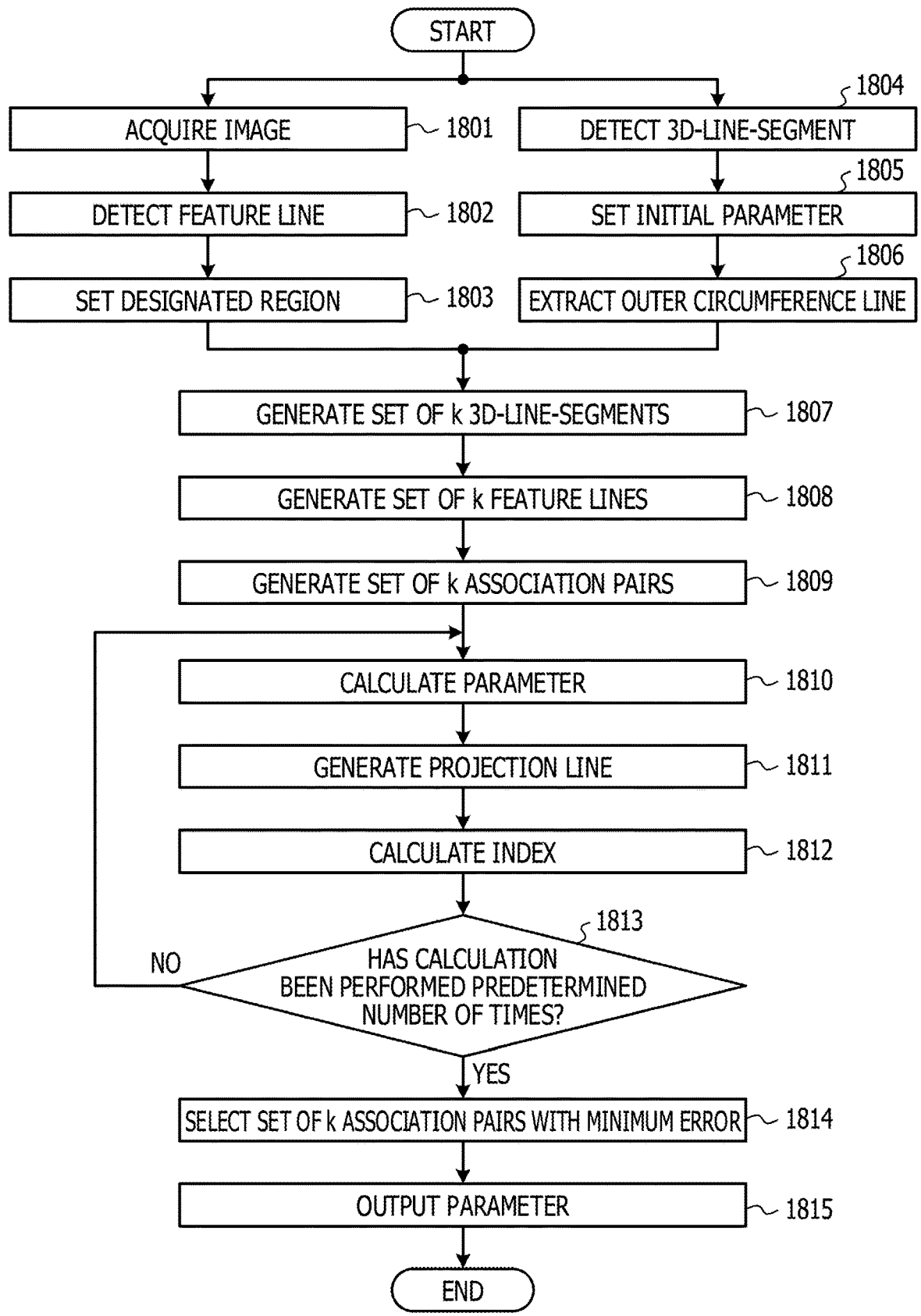
FIG. 18 is a flowchart illustrating a second specific example of the estimation process.

FIG. 18 is a flowchart illustrating a second specific example of the estimation process performed by the estimation device 1501 in FIG. 15. The processing of step 1801, step 1802, step 1804, step 1805, and steps 1807 to 1815 is the same as the processing of step 1201 to step 1213 of FIG. 12.

In step 1803, the region setting unit 1512 sets a designated region in the image 332. In step 1806, the outer circumference line extraction unit 1511 projects the 3D-line-segment onto the image 332, and extracts the outer circumference line from among a plurality of projection lines.

In step 1807, the generation unit 316 selects the set of k from among the 3D-line-segments corresponding to the outer circumference line. In step 1808, the generation unit 316 selects the set of k from among a plurality of feature lines included in the designated region.

Figure 19:
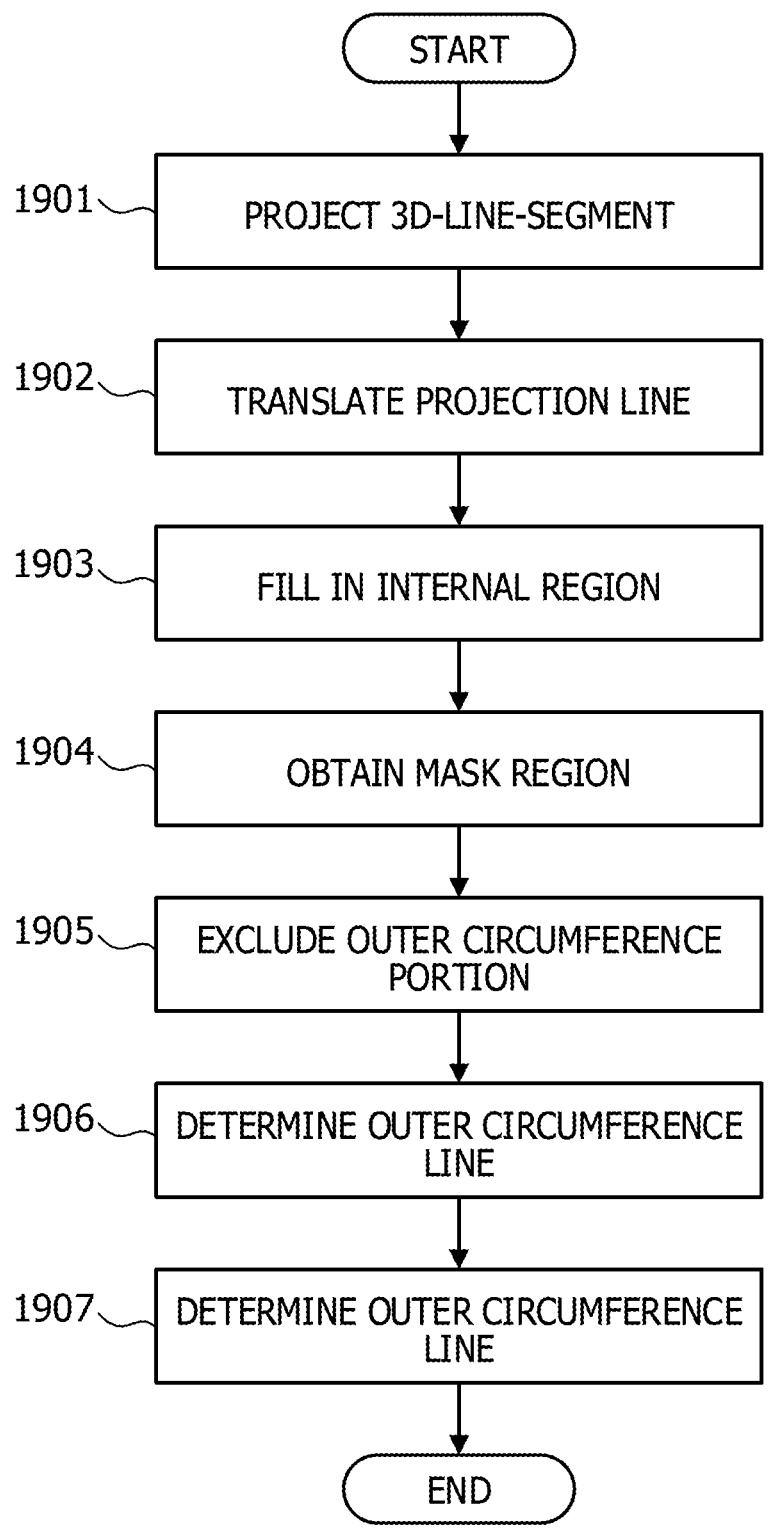
FIG. 19 is a flowchart of an outer circumference line extraction process.

FIG. 19 is a flowchart illustrating an example of the outer circumference line extraction process in step 1806 of FIG. 18. First, the outer circumference line extraction unit 1511 projects a 3D-line-segment onto the image 332, and obtains the minimum value umin of u coordinates of a plurality of projection lines, and the minimum value vmin of the v coordinates (step 1901). The outer circumference line extraction unit 1511 translates all projection lines according to the vector (umin, vmin) (step 1902).

Next, the outer circumference line extraction unit 1511 fills in an internal region surrounded by the projection line using the Flood Fill algorithm (step 1903).

Figure 20A:
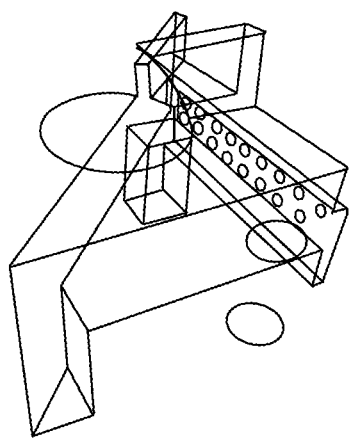
FIGS. 20A, and 20B are diagrams illustrating an internal region.
Figure 20B:
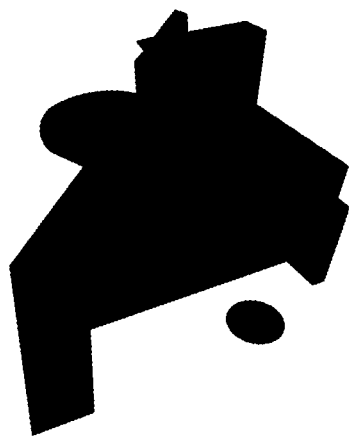

FIGS. 20A, and 20B illustrate an example of an internal region surrounded by projection lines. FIG. 20A illustrates an example of the projection lines obtained by projecting 3D-line-segments representing the shape of an object on the image 332. FIG. 20B illustrates an example of the internal region filled in according to the Flood Fill algorithm.

Next, the outer circumference line extraction unit 1511 obtains a mask region indicating the internal region using a closing algorithm combining the expansion processing and the contraction processing (step 1904). In a case where a portion which is not filled in even by the Flood Fill algorithm remains, it is possible to fill in the remaining portion by applying the closing algorithm. The outer circumference line extraction unit 1511 excludes the outer circumference portion of the mask region from the mask region using the expansion processing (step 1905).

Next, the outer circumference line extraction unit 1511 performs an outer circumference line determination on the projection line and extracts the projection line as the outer circumference line candidate (step 1906). For example, the outer circumference line extraction unit 1511 may extract the projection line as the outer circumference line candidate using the technique of Non-Patent Literature 5. The outer circumference line extraction unit 1511 determines, from among the projection lines as the outer circumference line candidate, a projection line whose length included in the mask region excluding the outer circumference portion is equal to or less than half the total length as the outer circumference line (step 1907).

Figure 21:
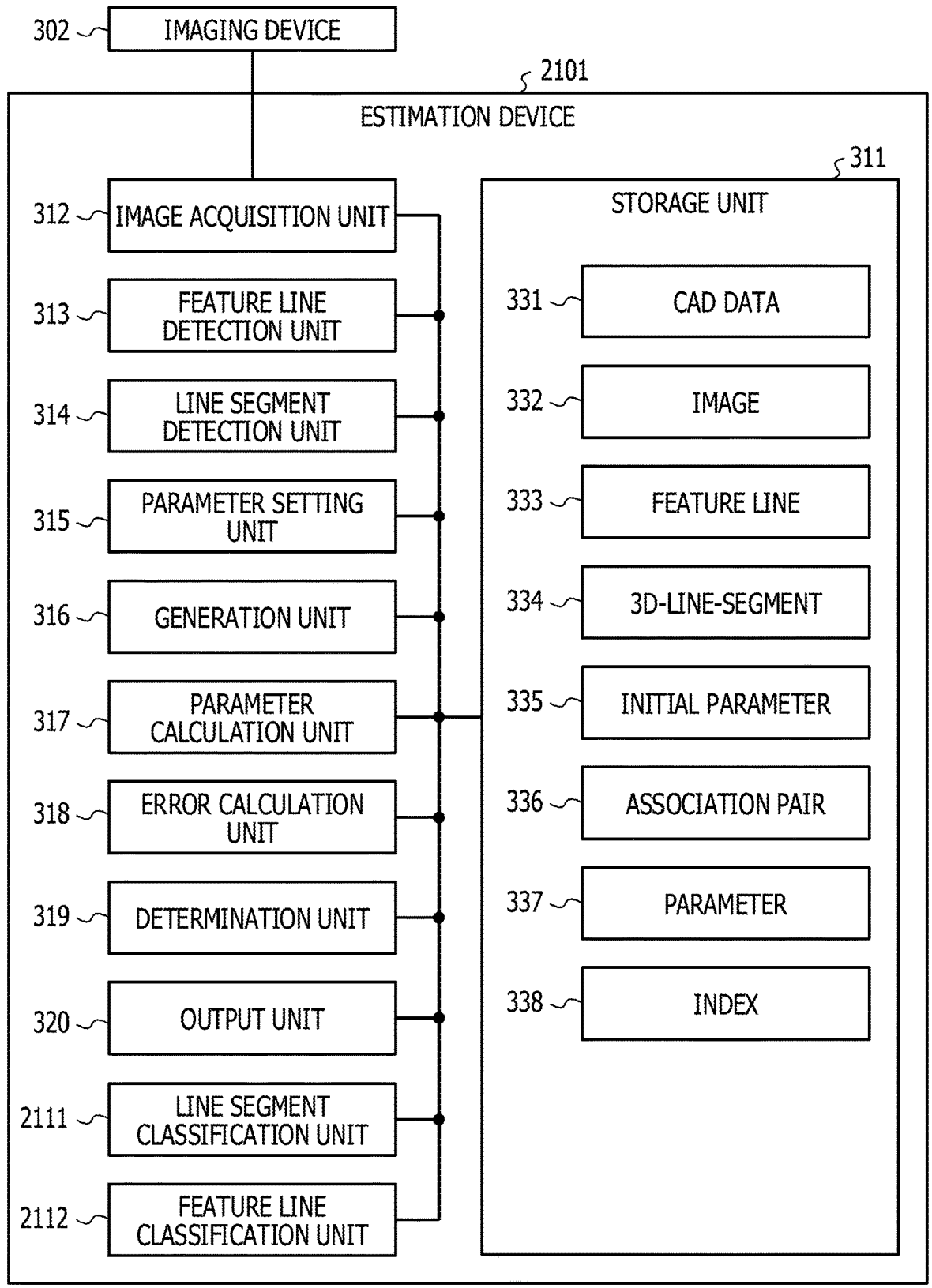
FIG. 21 is a functional configuration diagram illustrating a third specific example of the estimation device.

FIG. 21 illustrates a third specific example of the estimation device 101 in FIG. 1. An estimation device 2101 in FIG. 21 has a configuration in which a line segment classification unit 2111 and a feature line classification unit 2112 are added to the estimation device 301 in FIG. 3.

The line segment classification unit 2111 projects the remaining 3D-line-segments, which are obtained by removing the hidden line from the 3D-line-segments, onto the image 332 using the initial parameter 335 to generate a plurality of projection lines. The line segment classification unit 2111 generates a group of comparable 3D-line-segments in which the angle between projection lines is within a predetermined value from among the remaining 3D-line-segments For example, the angle in the range of 1° to 10° may be used as the predetermined value. One or more groups are generated depending on the distribution of the inclination of the projection line.

The generation unit 316 selects the set of k from among the remaining 3D-line-segments so as not to include two or more 3D-line-segments in the same group.

In a case where a plurality of projection lines close to parallel are included in the set of k projection lines, the accuracy of association tends to decrease. Therefore, the 3D-line-segment corresponding to projection lines whose inclination is similar to that of other projection lines is excluded from the set of k, and 3D-line-segment candidates are narrowed down, whereby it is possible to generate the association pair with the high accuracy of association to obtain an estimation result with a small error in a short time.

The feature line classification unit 2112 generates a group of comparable feature lines in which an angle between feature lines is within a predetermined value from among the plurality of feature lines detected from the image 332. For example, the angle in the range of 1° to 10° may be used as the predetermined value. One or more groups are generated depending on the distribution of the inclination of the feature line.

The generation unit 316 selects the set of k from among a plurality of feature lines so as not to include two or more feature lines in the same group. In this way, the feature line whose inclination is similar to that of other feature lines are excluded from the set of k, and feature line candidates are narrowed down. Therefore, the association pair with the high accuracy of association is generated, so that it is possible to obtain an estimation result with a small error in a short time.

Figure 22:
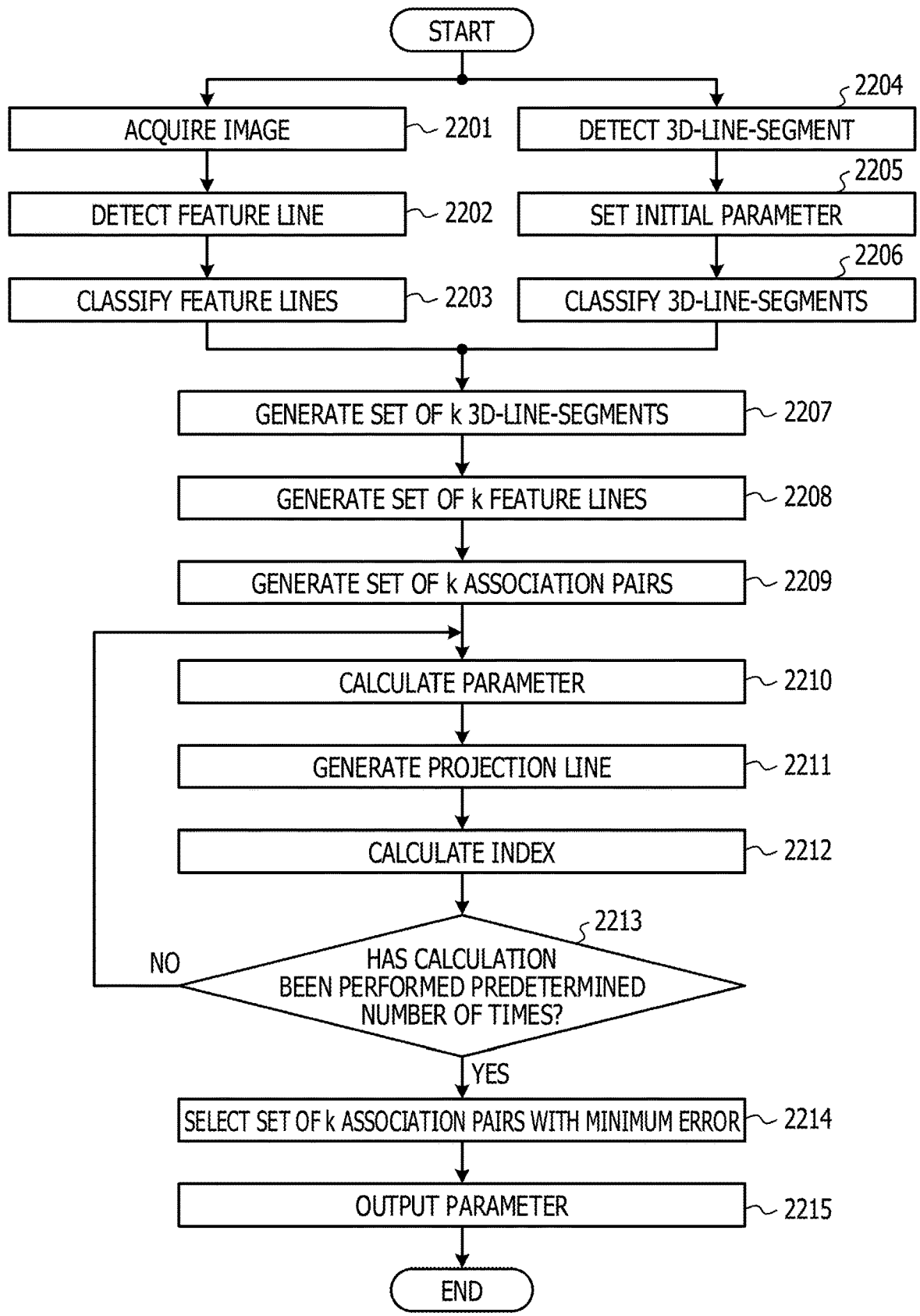
FIG. 22 is a flowchart illustrating a third specific example of the estimation process.

FIG. 22 is a flowchart illustrating a third specific example of the estimation process performed by the estimation device 2101 in FIG. 21. The processing of step 2201, step 2202, step 2204, step 2205, and step 2207 to step 2215 is the same as the processing of step 1201 to step 1213 of FIG. 12.

In step 2203, the feature line classification unit 2112 classifies a plurality of feature lines based on the angle between the feature lines. In this way, comparable feature lines in which an angle between feature lines is within a predetermined value are classified into one group.

In step 2206, the line segment classification unit 2111 classifies a plurality of 3D-line-segments based on the angle between the projection lines of the 3D-line-segments. In this way, comparable 3D-line-segments whose projection angle between the projection lines is within a predetermined value are classified into one group.

In step 2207, the generation unit 316 selects the set of k 3D-line-segments so as not to include two or more 3D-line-segments in the same group. In step 2208, the generation unit 316 selects the set of k feature lines so as not to include two or more feature lines in the same group.

The configurations of the estimation device in FIGS. 1, 3, 15, and 21 are merely examples, and some constituent elements may be omitted or changed depending on the use or conditions of the estimation device. For example, in the estimation device in FIG. 3, FIG. 15, and FIG. 21, in a case where the image 332 is stored in advance in the storage unit 311, the image acquisition unit 312 may be omitted. Instead of the CAD data 331, other shape information representing the shape of the object may be used.

In estimation device 1501 in FIG. 15, either one of the outer circumference line extraction unit 1511 or the region setting unit 1512 may be omitted. In the estimation device 2101 in FIG. 21, either one of the line segment classification unit 2111 or the feature line classification unit 2112 may be omitted.

The flowcharts in FIGS. 2, 12, 18, 19, and 22 are merely examples, and some processes may be omitted or changed depending on the configuration or conditions of the estimation device. For example, in a case where the image 332 is stored in advance in the storage unit 311, it is possible to omit the process of step 1201 of FIG. 12, step 1801 of FIG. 18, and step 2201 of FIG. 22.

In a case where the outer circumference line extraction unit 1511 is omitted, the process of step 1806 in FIG. 18 may be omitted. In a case where the region setting unit 1512 is omitted, the process of step 1803 in FIG. 18 may be omitted.

In a case where the line segment classification unit 2111 is omitted, the process of step 2206 in FIG. 22 may be omitted. In a case where the feature line classification unit 2112 is omitted, the process of step 2203 of FIG. 22 may be omitted.

Figure 6:
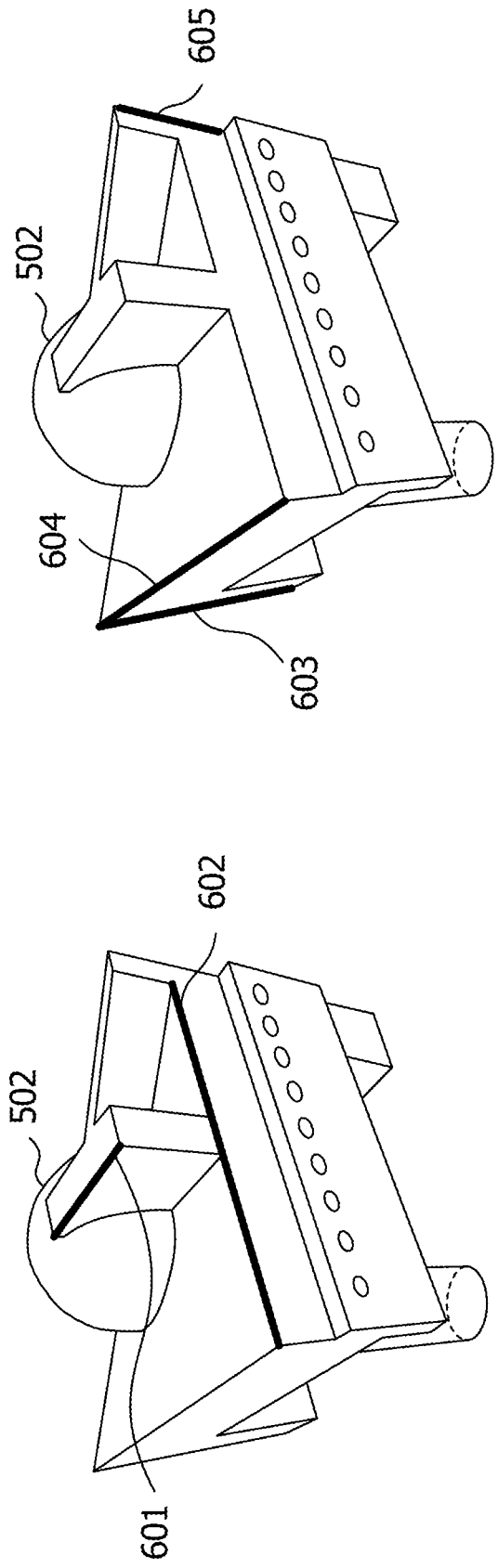
FIGS. 6A, 6B, and 6C are diagrams illustrating projection lines.

The CAD data in FIG. 4, the 3D-line-segment and feature line in FIG. 5, the projection line in FIGS. 6 and 7, and the feature line in FIGS. 8A, and 8B are merely example, and the CAD data, the 3D-line-segment, the projection line, and the feature line changes depending on the configuration or condition of the object to be photographed or the estimation device.

The determination result in FIG. 9 is merely an example, and the determination result for the set of four feature line candidates changes depending on the configuration or condition of the object to be photographed or the estimation device. The method of calculating the error in FIGS. 10 and 11 is merely an example, and another calculation method may be used depending on the configuration or condition of the estimation device.

The sorting method of FIG. 13 is merely an example, and another sorting method may be used depending on the configuration or condition of the estimation device. The error in FIGS. 14A, 14B, and 14C are merely an example, and the error in the estimation process changes depending on the configuration or condition of the object to be photographed or the estimation device.

The designated region in FIGS. 16A, and 16B, the outer edge portion in FIG. 17, and the internal region in FIGS. 20A, and 20B are merely examples, and the designated region, the outer edge portion, and the internal region changes depending on the configuration or condition of the object to be photographed or the estimation device.

The calculation formulas of Equations (1) to (5) are merely examples, and other calculation formulas may be used depending on the configuration or conditions of the estimation device.

Figure 23:
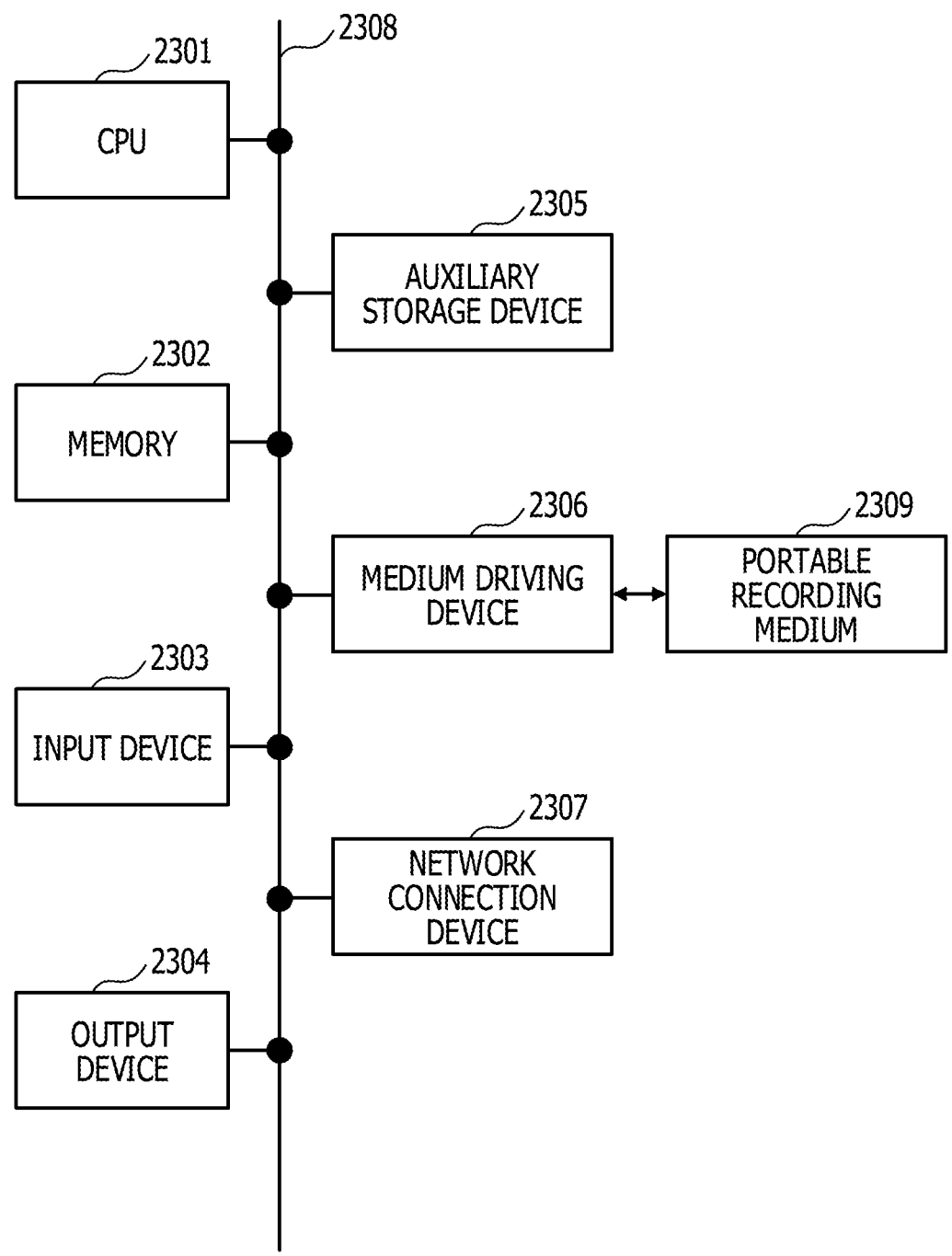
FIG. 23 is a configuration diagram of an information processing apparatus.

FIG. 23 illustrates a configuration example of an information processing apparatus (computer) used as the estimation device in FIGS. 1, 3, 15, and 21. The information processing apparatus in FIG. 23 includes a central processing unit (CPU) 2301, a memory 2302, an input device 2303, an output device 2304, an auxiliary storage device 2305, a medium driving device 2306, and a network connection device 2307. These components are connected to each other by a bus 2308. The imaging device 302 in FIGS. 3, 15, and 21 may be connected to the bus 2308.

The memory 2302 is, for example, a semiconductor memory such as a read only memory (ROM), a random access memory (RAM), a flash memory, and stores programs and data used for processing. The memory 2302 may be used as the storage unit 111 in FIG. 1 or the storage unit 311 in FIGS. 3, 15, and 21.

The CPU 2301 (processor) executes a program using, for example, the memory 2302, and operates as the detection unit 112, the generation unit 113, and the estimation unit 114 in FIG. 1.

The CPU 2301 executes a program using the memory 2302, and also operates as the image acquisition unit 312, the feature line detection unit 313, and the line segment detection unit 314 in FIGS. 3, 15, and 21. The CPU 2301 executes a program using the memory 2302, and also operates as the parameter setting unit 315, the generation unit 316, the parameter calculation unit 317, the error calculation unit 318, and the determination unit 319.

The CPU 2301 executes a program using the memory 2302, and also operates as the outer circumference line extraction unit 1511 and the region setting unit 1512 in FIG. 15. The CPU 2301 executes a program using the memory 2302, and also operates as the line segment classification unit 2111 and the feature line classification unit 2112 in FIG. 21.

The input device 2303 is, for example, a keyboard, a pointing device, or the like, and is used for inputting an instruction or information from the operator or the user. The output device 2304 is, for example, a display device, a printer, a speaker, or the like, and is used for an inquiry or an instruction to an operator or a user, and an output of a processing result. The processing result may be the estimation result of the position and the orientation of the imaging device 302. The output device 2304 may be used as the output unit 320 in FIGS. 3, 15, and 21.

The auxiliary storage device 2305 is, for example, a magnetic disk device, an optical disk device, a magneto-optical disk device, a tape device, or the like. The auxiliary storage device 2305 may be a hard disk drive or a flash memory. The information processing apparatus may store programs and data in the auxiliary storage device 2305 and load them into the memory 2302 for use. The auxiliary storage device 2305 may be used as the storage unit 111 in FIG. 1 or the storage unit 311 in FIGS. 3, 15, and 21.

The medium driving device 2306 drives a portable recording medium 2309, and accesses the recorded content. The portable recording medium 2309 is a memory device, a flexible disk, an optical disk, a magneto-optical disk, or the like. The portable recording medium 2309 may be a compact disk read only memory (CD-ROM), a digital versatile disk (DVD), a universal serial bus (USB) memory, or the like. An operator or a user may store programs and data in the portable recording medium 2309 and load them into the memory 2302 for use.

In this way, a computer readable recording medium for storing programs and data used for image processing is a physical (non-transitory) recording medium such as the memory 2302, the auxiliary storage device 2305, or the portable recording medium 2309.

The network connection device 2307 is connected to a communication network such as a local area network (LAN), a wide area network (WAN), and is a communication interface circuit that performs data conversion accompanying communication. The information processing apparatus receives a program and data from an external apparatus via the network connection device 2307, and load them into the memory 2302 for use. The network connection device 2307 may be used as the output unit 320 in FIG. 3, FIG. 15, and FIG. 21.

It is unnecessary for the information processing apparatus to include all the constituent components in FIG. 23. It is also possible to omit some components depending on the use or condition. For example, when the portable recording medium 2309 or a communication network is not used, the medium driving device 2306 or the network connection device 2307 may be omitted.

Although the disclosed embodiment and its advantages have been described in detail, those skilled in the art will appreciate that, without departing from the scope of the disclosure as specifically set forth in the claims, it will be possible to make various changes, additions and omissions.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An estimation device comprising:
    a memory configured to store shape information including a plurality of line segments representing a shape of an object; and
    a processor coupled to the memory and configured to:
    detect a plurality of feature lines from an image of the object photographed by an imaging device,
    generate a plurality of sets of a predetermined number of line segments among the plurality of line segments, wherein the predetermined number of line segments is greater than one,
    select a set to be processed from among the plurality of sets based on a length-first selection order in which a line segment that is longer than other line segments is preferentially selected,
    generate a predetermined number of combinations in which the predetermined number of line segments included in the set to be processed and the predetermined number of feature lines among the plurality of feature lines are associated with each other on a one-to-one basis, and estimate a position and an orientation of the imaging device in a three-dimensional space using the predetermined number of combinations.

2. The estimation device according to claim 1, wherein the selecting the set to be processed includes selecting the set to be processed by combining the length-first selection order and a distance-first selection order in which a pair of line segments that is more distant from each other than other line segment pairs is preferentially selected.

3. The estimation device according to claim 2, wherein the selecting the set to be processed includes selecting the set to be processed by combining the length-first selection order, the distance-first selection order, and a spatial-distribution-first selection order in which a pair of line segments each of which does not exist on a same plane is more preferentially selected than a pair of line segments each of which exists on a same plane.

4. The estimation device according to claim 1, wherein the generating the plurality of sets includes projecting the predetermined number of line segments included in the set to be processed onto the image to generate a predetermined number of projection lines, and the selecting the set to be processed includes selecting the predetermined number of feature lines from among the plurality of feature lines based on an angle between projection lines included in the predetermined number of projection lines.

5. The estimation device according to claim 1, wherein a processor further configured to project the plurality of line segments onto the image to generate a plurality of projection lines, and extract a projection line representing an outer circumference of the object among the plurality of projection lines, and the selecting the set to be processed includes selecting the predetermined number of line segments from among line segments corresponding to projection lines representing the outer circumference of the object.

6. The estimation device according to claim 1, wherein a processor further configured to set a designated region in the image, and the selecting the set to be processed includes extracting a plurality of feature lines included in the designated region among the plurality of feature lines, and selecting the predetermined number of feature lines from among the plurality of extracted feature lines.

7. The estimation device according to claim 1, wherein a processor further configured to project the plurality of line segments onto the image to generate a plurality of projection lines, and generate, from the plurality of line segments, a group of comparable line segments in which an angle between projection lines are within a predetermined value, and the selecting the set to be processed includes selecting the predetermined number of line segments so as not to include a plurality of line segments in the group of comparable line segments.

8. The estimation device according to claim 1, wherein a processor further configured to generate, from the plurality of feature lines, a group of comparable feature lines in which an angle between feature lines is within a predetermined value, and the selecting the set to be processed includes selecting the predetermined number of feature lines so as not to include a plurality of feature lines in the group of the comparable feature lines.

9. An estimation method comprising:

detecting a plurality of feature lines from an image of an object photographed by an imaging device, generating a plurality of sets of a predetermined number of line segments among a plurality of line segments included in shape information representing a shape of the object, where the predetermined number of line segments is greater than one, selecting a set to be processed from among the plurality of sets based on a length-first selection order in which a line segment that is longer than other line segments is preferentially selected, generating a predetermined number of combinations in which a predetermined number of projection lines included in the set to be processed and a predetermined number of feature lines among the plurality of feature lines are associated with each other on a one-to-one basis, and estimating a position and an orientation of the imaging device in a three-dimensional space using the predetermined number of combinations.

10. The estimation method according to claim 9, wherein the selecting the set to be processed includes selecting the set to be processed by combining the length-first selection order and a distance-first selection order in which a pair of line segments that is more distant from each other than other line segment pairs is preferentially selected.

11. The estimation method according to claim 10, wherein the selecting the set to be processed includes selecting the set to be processed by combining the length-first selection order, the distance-first selection order, and a spatial-distribution-first selection order in which a pair of line segments each of which does not exist on a same plane is more preferentially selected than a pair of line segments each of which exists on a same plane.

12. A non-transitory computer-readable storage medium storing a program that causes a processor included in an estimation device to execute a process, the process comprising:

detecting a plurality of feature lines from an image of an object photographed by an imaging device, generating a plurality of sets of a predetermined number of line segments among a plurality of line segments included in shape information representing a shape of the object, where the predetermined number of line segments is greater than one, selecting a set to be processed from among the plurality of sets based on a length-first selection order in which a line segment that is longer than other line segments is preferentially selected, generating a predetermined number of combinations in which a predetermined number of projection lines included in the set to be processed and a predetermined number of feature lines among the plurality of feature lines are associated with each other on a one-to-one basis, and estimating a position and an orientation of the imaging device in a three-dimensional space using the predetermined number of combinations.

* * * * *